US012682043B2

(12) United States Patent
Grocutt

(10) Patent No.: US 12,682,043 B2
(45) Date of Patent: Jul. 14, 2026

(54) APPARATUS AND METHOD FOR HANDLING EXCEPTIONS

(71) Applicant: Arm Limited, Cambridge (GB)

(72) Inventor: Thomas Christopher Grocutt, Cambridge (GB)

(73) Assignee: Arm Limited, Cambridge (GB)

( * ) Notice: Subject to any disclaimer, the term of this patent is extended or adjusted under 35 U.S.C. 154(b) by 659 days.

(21) Appl. No.: 17/756,948

(22) PCT Filed: Nov. 3, 2020

(86) PCT No.: PCT/GB2020/052781
§ 371 (c)(1),
(2) Date: Jun. 6, 2022

(87) PCT Pub. No.: WO2021/116652
PCT Pub. Date: Jun. 17, 2021

(65) Prior Publication Data
US 2022/0366036 A1    Nov. 17, 2022

(30) Foreign Application Priority Data
Dec. 11, 2019    (GB) ...................................... 1918214

(51) Int. Cl.
*G06F 21/54*          (2013.01)
*G06F 9/30*           (2018.01)
(Continued)

(52) U.S. Cl.
CPC ............ *G06F 21/54* (2013.01); *G06F 9/3012* (2013.01); *G06F 9/461* (2013.01); *G06F 21/554* (2013.01); *G06F 2209/481* (2013.01)

(58) Field of Classification Search
CPC ........ G06F 21/54; G06F 9/3012; G06F 9/461; G06F 21/554; G06F 2209/481
(Continued)

(56) References Cited

U.S. PATENT DOCUMENTS 9,116,711 B2    8/2015  Grocutt
9,202,071 B2    12/2015 Grocutt et al.
                (Continued)

FOREIGN PATENT DOCUMENTS

GB          2411254 A        8/2005
GB          2563887 A        2/2019
                (Continued)

OTHER PUBLICATIONS

Robert Bedichek, "Some Efficient Architecture Simulation Techniques", Department of Computer Science, FR-35 University of Washington, Seattle, Washington 98195; 1990.
(Continued)

*Primary Examiner* — Moeen Khan
(74) *Attorney, Agent, or Firm* — NIXON & VANDERHYE P.C.

(57)          ABSTRACT
An apparatus for handling exceptions, including a processing circuitry operable in at least one security domain to execute program code that includes a plurality of exception handling routines executed in response to corresponding exceptions, and a plurality of registers for storing data for access by the processing circuitry when executing the program code. The exception control circuitry is arranged in response to occurrence of a given exception from background processing to trigger a state saving operation to save data from the plurality of registers before triggering the processing circuitry to execute a given exception handling routine. Configuration storage provides configuration information used to categorise exception handling routines. The exception control circuitry is arranged to determine with reference to the configuration information whether the given exception handling routine is of a first or second category within the security domain that the given exception handling routine will be executed in.

22 Claims, 12 Drawing Sheets

(51) Int. Cl.
   *G06F 9/46*        (2006.01)
   *G06F 21/55*       (2013.01)

(58) Field of Classification Search
   USPC ......................................................... 726/26
   See application file for complete search history.

(56)                    References Cited

U.S. PATENT DOCUMENTS

| | | | | |
|---|---|---|---|---|
| 9,465,617 | B1 | 10/2016 | Warkentin et al. | |
| 2007/0179833 | A1* | 8/2007 | Moorthy | G06Q 50/184 |
| | | | | 705/310 |
| 2012/0036341 | A1 | 2/2012 | Morfey et al. | |
| 2013/0205125 | A1 | 8/2013 | Grocutt | |
| 2013/0205389 | A1* | 8/2013 | Grocutt | G06F 21/52 |
| | | | | 726/22 |
| 2013/0205403 | A1* | 8/2013 | Grocutt | G06F 21/52 |
| | | | | 726/27 |
| 2013/0212700 | A1* | 8/2013 | Grocutt | G06F 21/606 |
| | | | | 726/27 |
| 2014/0373171 | A1 | 12/2014 | Grocutt | |
| 2015/0073180 | A1 | 3/2015 | Knauf et al. | |
| 2015/0227462 | A1* | 8/2015 | Grocutt | G06F 12/1441 |
| | | | | 711/147 |
| 2019/0042482 | A1 | 2/2019 | Katragada et al. | |

FOREIGN PATENT DOCUMENTS

| | | |
|---|---|---|
| JP | 2008-257734 | 10/2008 |
| WO | 2014/053802 A1 | 4/2014 |
| WO | 2014/053806 A1 | 4/2014 |

OTHER PUBLICATIONS

Office Action for TW Application No. 109141945 issued Sep. 27, 2024 and English translation, 37 pages.
Office Action for IN Application No. 202217034252 dated Apr. 10, 2025, 9 pages.
Office Action for KR Application No. 10-2022-7023178 issued Nov. 19, 2024 and English translation, 19 pages.
Office Action for CN Application No. 202080091711.8 issued Mar. 19, 2026 and English translation, 20 pages.

* cited by examiner

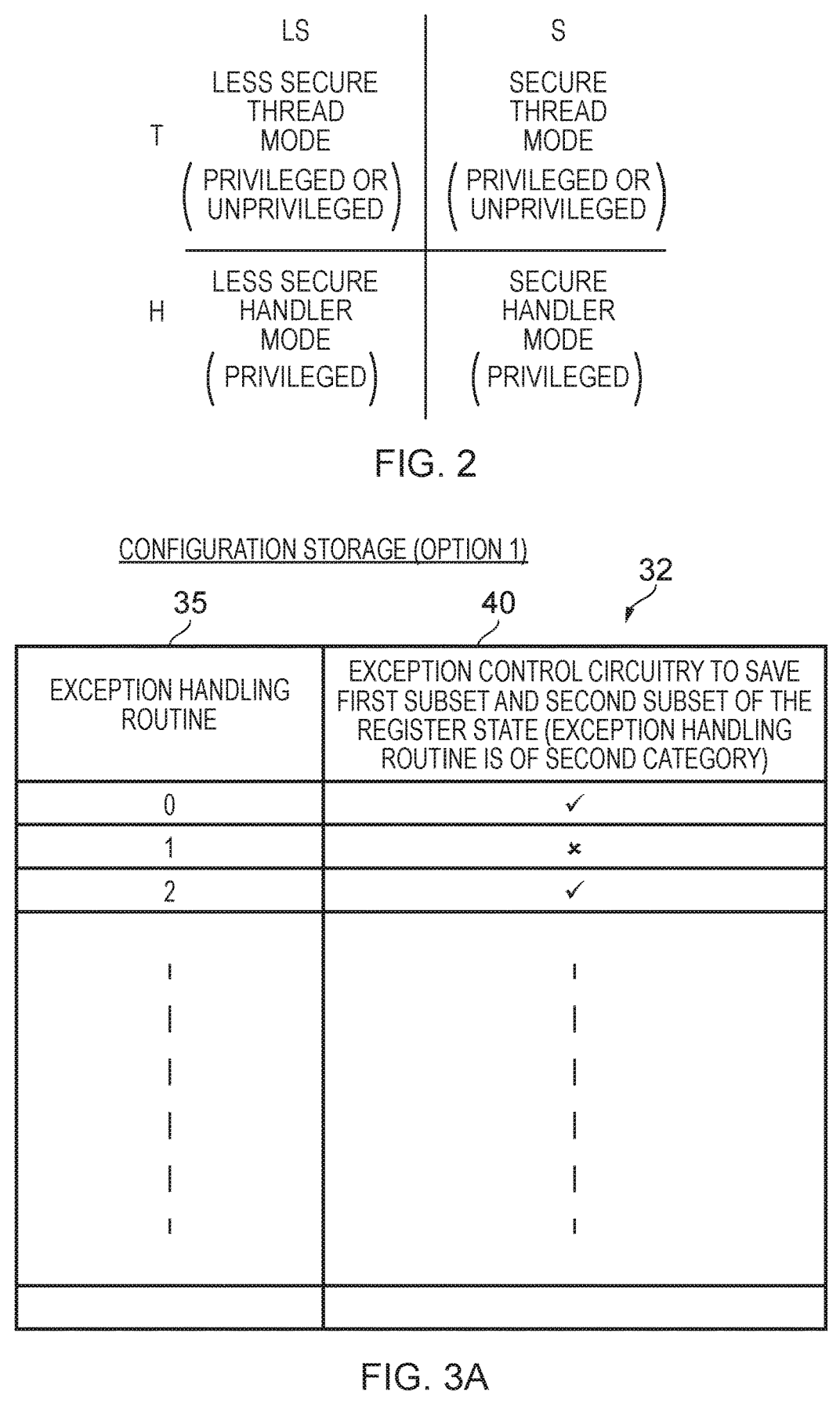

|  | LS | S |
|---|---|---|
| T | LESS SECURE THREAD MODE $\left(\begin{array}{l}\text{PRIVILEGED OR}\\\text{UNPRIVILEGED}\end{array}\right)$ | SECURE THREAD MODE $\left(\begin{array}{l}\text{PRIVILEGED OR}\\\text{UNPRIVILEGED}\end{array}\right)$ |
| H | LESS SECURE HANDLER MODE $\left(\text{PRIVILEGED}\right)$ | SECURE HANDLER MODE $\left(\text{PRIVILEGED}\right)$ |

FIG. 2

CONFIGURATION STORAGE (OPTION 1)

35        40        32

| EXCEPTION HANDLING ROUTINE | EXCEPTION CONTROL CIRCUITRY TO SAVE FIRST SUBSET AND SECOND SUBSET OF THE REGISTER STATE (EXCEPTION HANDLING ROUTINE IS OF SECOND CATEGORY) |
|---|---|
| 0 | ✓ |
| 1 | ✗ |
| 2 | ✓ |
| ⋮ | ⋮ |
|  |  |

FIG. 3A

CONFIGURATION STORAGE (OPTION 2)

32

CONFIGURATION STORAGE (OPTION 3)

32

| 45 | 50 |
|---|---|
| EXCEPTION HANDLING ROUTINE | CONFIGURABLE PRIORITY |
| | |
| | |
| | |
| | |
| | |

Figure 4:
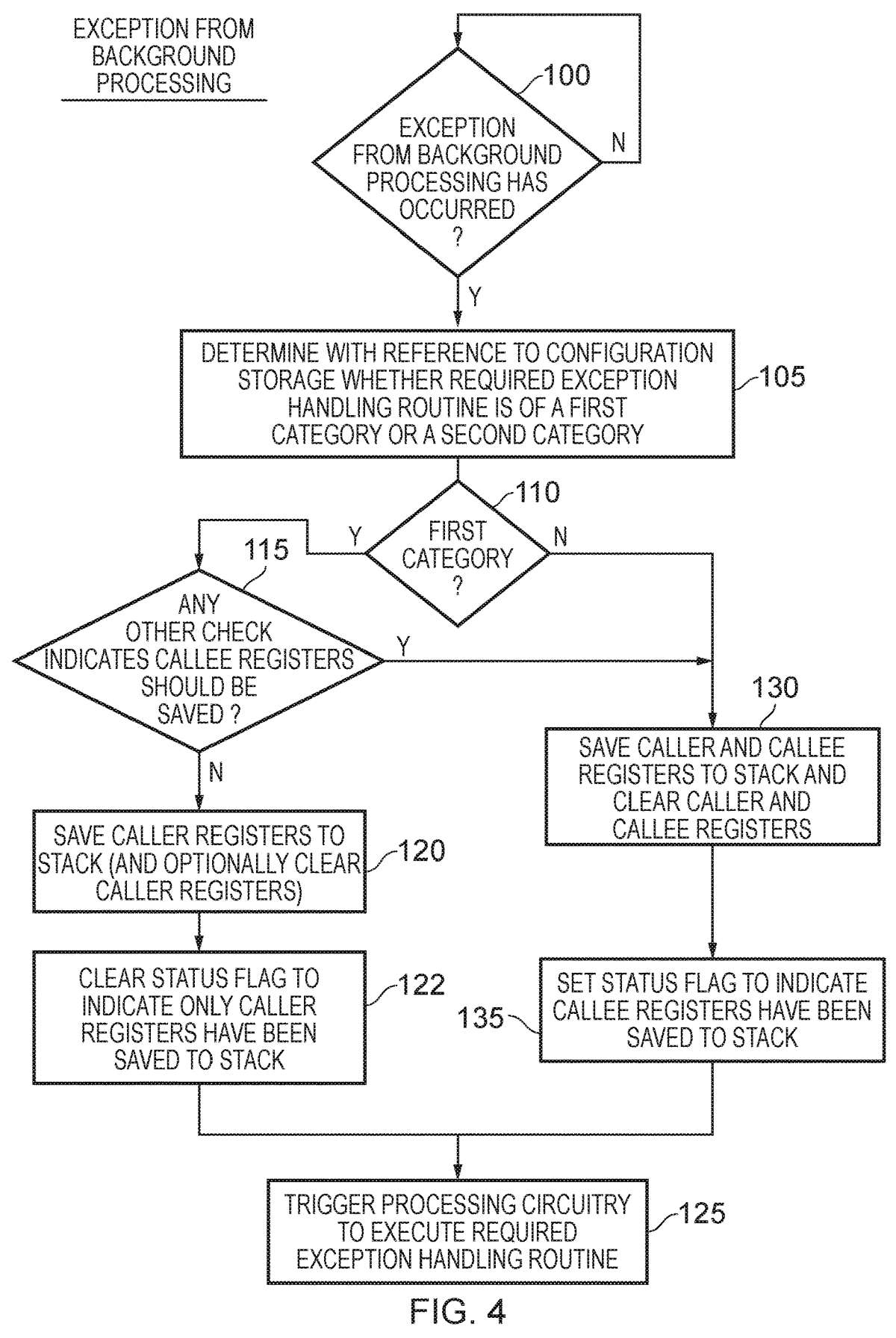

EXCEPTION FROM
BACKGROUND
PROCESSING
_____

100

EXCEPTION
FROM BACKGROUND
PROCESSING HAS
OCCURRED
?

N

Y

DETERMINE WITH REFERENCE TO CONFIGURATION
STORAGE WHETHER REQUIRED EXCEPTION
HANDLING ROUTINE IS OF A FIRST
CATEGORY OR A SECOND CATEGORY

105

110

FIRST
CATEGORY
?

Y          N

115

ANY
OTHER CHECK
INDICATES CALLEE REGISTERS
SHOULD BE
SAVED ?

Y

N

SAVE CALLER AND CALLEE
REGISTERS TO STACK AND
CLEAR CALLER AND
CALLEE REGISTERS

130

SAVE CALLER REGISTERS TO
STACK (AND OPTIONALLY CLEAR
CALLER REGISTERS)

120

CLEAR STATUS FLAG TO
INDICATE ONLY CALLER
REGISTERS HAVE BEEN
SAVED TO STACK

122

135

SET STATUS FLAG TO INDICATE
CALLEE REGISTERS HAVE BEEN
SAVED TO STACK

TRIGGER PROCESSING CIRCUITRY
TO EXECUTE REQUIRED
EXCEPTION HANDLING ROUTINE

STEP 105 OF FIGURE 4 IF THRESHOLD PRIORITY USED

EXCEPTION
RETURN
PROCESSING

STEP 230 OF FIG. 6

PRE-EMPTION
PROCESSING

SIMULATOR
IMPLEMENTATION

TARGET
CODE                    500

VIRTUAL HARDWARE
INTERFACE

505

SIMULATOR          520          525          530

PROCESSING
PROGRAM
LOGIC

EXCEPTION
CONTROL
PROGRAM
LOGIC

DATA
STRUCTURE
EMULATING
PROGRAM LOGIC

HOST OS                 510

HOST HARDWARE           515

APPARATUS AND METHOD FOR HANDLING EXCEPTIONS

BACKGROUND

The present technique relates to an apparatus and method for handling exceptions.

When a processor is executing program code, it will typically have access to a plurality of registers that are used to store data used by the processor when executing the program code. On taking an exception from background processing, it is known to provide exception control circuitry in hardware that is arranged to perform state saving of the data from a first subset of the registers prior to triggering the processor to execute an exception handling routine to process the exception. By taking such an approach, the exception handling routine can utilise the first subset of registers without needing to perform any state saving of the data in those registers, and only needs to perform state saving for any additional registers not in the first subset if the exception handling routine needs to interact with those registers.

When taking an exception, it has typically been the case that the exception handling routine will be executed in the same, or a higher, level of privilege as the background code, and hence it was not considered problematic to allow the exception handling routine to have visibility of the content of the registers outside of the first subset (i.e. the data in the registers that had not been subjected to state saving by the exception control circuitry hardware). However, in modern systems it is becoming desirable to also support use of exception handling routines that are not trusted, for example because they have been provided by a third party vendor. In such cases, steps need to be taken to avoid the untrusted exception handling routine gaining access to data that it should not have access to. However, interrupt latency is also becoming a significant issue in modern systems, and it would hence be desirable to provide a system that supported the use of both trusted and untrusted exception handling routines, whilst alleviating interrupt latency issues.

SUMMARY

In a first example arrangement, there is provided an apparatus comprising: processing circuitry operable in at last one security domain to execute program code that includes a plurality of exception handling routines executed in response to corresponding exceptions; a plurality of registers to store data for access by the processing circuitry when executing the program code, the registers comprising a first subset of registers and a second subset of registers non-overlapping with the first subset; exception control circuitry, responsive to occurrence of a given exception from background processing, to trigger a state saving operation to save data from the plurality of registers before triggering the processing circuitry to execute a given exception handling routine corresponding to the given exception; and configuration storage to store configuration information used to categorise exception handling routines within the plurality of exception handling routines; wherein the exception control circuitry is arranged to determine with reference to the configuration information whether the given exception handling routine is of a first category or a second category within the security domain that the given exception handling routine will be executed in, and is arranged, when triggering the state saving operation, to trigger saving the data from the first subset of registers when the given exception handling routine is of the first category, and to trigger saving the data from both the first subset and the second subset of registers when the given exception handling routine is of the second category.

In another example arrangement, there is provided a method of handling exceptions within an apparatus, comprising: executing, on processing circuitry operable in at last one security domain, program code that includes a plurality of exception handling routines executed in response to corresponding exceptions; storing in a plurality of registers data for access by the processing circuitry when executing the program code, the registers comprising a first subset of registers and a second subset of registers non-overlapping with the first subset; employing exception control circuitry, in response to occurrence of a given exception from background processing, to trigger a state saving operation to save data from the plurality of registers before triggering the processing circuitry to execute a given exception handling routine corresponding to the given exception; storing configuration information used to categorise exception handling routines within the plurality of exception handling routines; determining with reference to the configuration information whether the given exception handling routine is of a first category or a second category within the security domain that the given exception handling routine will be executed in; and causing the exception control circuitry, when triggering the state saving operation, to trigger saving the data from the first subset of registers when the given exception handling routine is of the first category, and to trigger saving the data from both the first subset and the second subset of registers when the given exception handling routine is of the second category.

In a still further example arrangement, there is provided an apparatus comprising: processing means for executing, in at last one security domain, program code that includes a plurality of exception handling routines executed in response to corresponding exceptions; a plurality of register means for storing data for access by the processing means when executing the program code, the register means comprising a first subset of register means and a second subset of register means non-overlapping with the first subset; exception control means for triggering, in response to occurrence of a given exception from background processing, a state saving operation to save data from the plurality of register means before triggering the processing means to execute a given exception handling routine corresponding to the given exception; and configuration storage means for storing configuration information used to categorise exception handling routines within the plurality of exception handling routines; wherein the exception control means for determining with reference to the configuration information whether the given exception handling routine is of a first category or a second category within the security domain that the given exception handling routine will be executed in, and, when triggering the state saving operation, for triggering saving the data from the first subset of register means when the given exception handling routine is of the first category, and for triggering saving the data from both the first subset and the second subset of register means when the given exception handling routine is of the second category.

In a yet further example arrangement, there is provided a computer program for controlling a host data processing apparatus to provide an instruction execution environment, comprising: processing program logic operable in at last one security domain to execute program code that includes a plurality of exception handling routines executed in response to corresponding exceptions; data structure emulating program logic to maintain a plurality of register data structures to store data for access by the processing program logic when executing the program code, the register data structures comprising a first subset of data structures and a second subset of data structures non-overlapping with the first subset; and exception control program logic, responsive to occurrence of a given exception from background processing, to trigger a state saving operation to save data from the plurality of register data structures before triggering the processing program logic to execute a given exception handling routine corresponding to the given exception; wherein the data structure emulating program logic is further arranged to maintain a configuration data structure to store configuration information used to categorise exception handling routines within the plurality of exception handling routines; and wherein the exception control program logic is arranged to determine with reference to the configuration information whether the given exception handling routine is of a first category or a second category within the security domain that the given exception handling routine will be executed in, and is arranged, when triggering the state saving operation, to trigger saving the data from the first subset of data structures when the given exception handling routine is of the first category, and to trigger saving the data from both the first subset and the second subset of data structures when the given exception handling routine is of the second category. A computer readable medium may be provided for storing such a computer program, and the computer readable medium may be in a non-transitory or a transitory form.

BRIEF DESCRIPTION OF THE DRAWINGS

The present technique will be described further, by way of illustration only, with reference to examples thereof as illustrated in the accompanying drawings, in which:

FIG. 2 shows an example of different domains and modes of operation of the processing circuitry of FIG. 1, in accordance with one example arrangement;

FIGS. 3A to 3C illustrate different example implementations of the configuration storage of FIG. 1;

FIG. 4 is a flow diagram showing steps performed on taking an exception from background processing, in accordance with one example arrangement;

DESCRIPTION OF EXAMPLES

Figure 1:
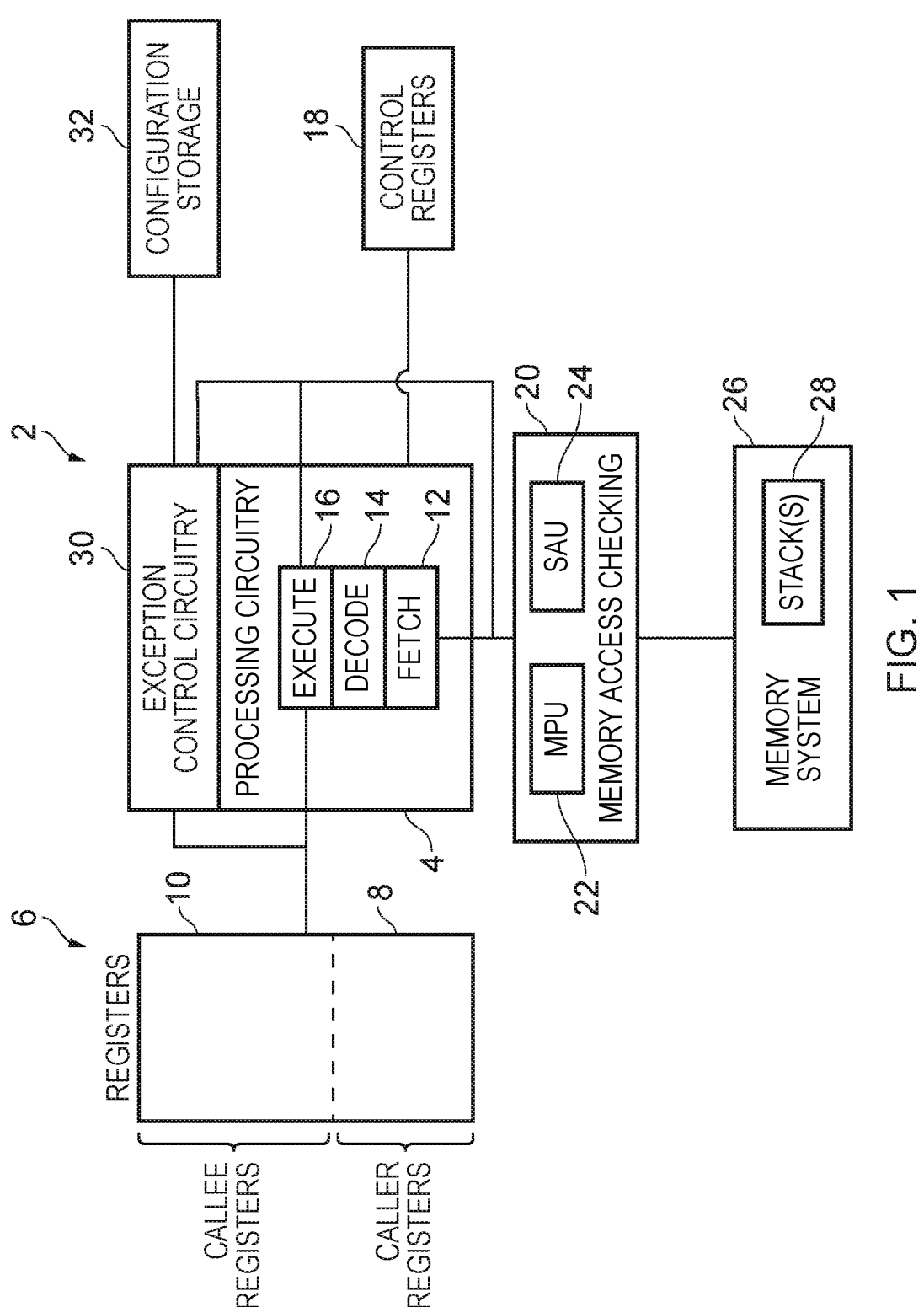
FIG. 1 schematically illustrates an example of a data processing system in accordance with one example arrangement.

As mentioned earlier, in modern systems it may be the case that not all exception handling routines are trusted, and it may instead be desirable to allow use of one or more exception handling routines that are not trusted, for example because they have been provided by a third party vendor. To accommodate such untrusted exception handling routines, it may be possible to provide a software wrapper that is trusted, so that on entry to the exception handling routine, the wrapper software is first executed to perform some initial tasks before allowing the main body of the untrusted exception handling routine to be executed. Similarly, the wrapper software could be executed to perform some additional operations prior to returning from such an exception handling routine. As an example of the operations that may be performed by such wrapper software, the wrapper software may be responsible for saving the state of at least some other registers not within the earlier-mentioned first subset whose state saving is performed by exception control circuitry in hardware. The wrapper may also clear the registers prior to executing the main body of the exception handling routine, thereby ensuring that the untrusted exception handling routine does not have visibility of any of the register content associated with the background processing. The wrapper software could also be used to restore the contents of such registers after completion of the untrusted main body, but prior to returning from the exception.

However, in modern systems interrupt latency is becoming a significant issue, and the performance of the above steps by the wrapper software could significantly impact the interrupt latency. It would hence be desirable to provide a system that supported the use of both trusted and untrusted exception handling routines, whilst alleviating interrupt latency issues.

In accordance with the techniques described herein an apparatus is provided that has processing circuitry operable in at least one security domain to execute program code that includes a plurality of exception handling routines executed in response to corresponding exceptions. The processing circuitry may for example be operable in one of a number of different security domains including at least a secure domain and a less secure domain, and accesses to memory may be controlled dependent on which security domain the processing circuitry is operating in. However, it should be noted that there is no requirement for the processing circuitry to be operable in multiple security domains, and the general technique described herein can be utilised also in systems where there is only a single security domain.

In addition to the processing circuitry, the apparatus has a plurality of registers that are used to store data for access by the processing circuitry when executing the program code, and the registers are arranged to comprise a first subset of registers and a second subset of registers non-overlapping with the first subset. Further, exception control circuitry hardware is provided that is responsive to occurrence of a given exception from background processing, to trigger a state saving operation to save data from the plurality of registers before triggering the processing circuitry to execute a given exception handling routine corresponding to the given exception. In particular, by default the exception control circuitry will trigger a state saving operation in respect of the first subset of registers, but as will be discussed further herein, depending on the exception handling routine that is to be triggered in order to process the given exception, the exception control circuitry hardware may also trigger state saving in respect of the second subset of registers.

In particular, the apparatus further has configuration storage that is used to store configuration information used to categorise exception handling routines within the plurality of exception handling routines. The configuration information provided within the configuration storage may be used to categorise every exception handling routine, or alternatively there may be a subset of exception handling routines that are effectively always of a predetermined category, and hence for which configuration information in the configuration storage is not required.

Further, the exception control circuitry is arranged to determine with reference to the configuration information whether the given exception handling routine is of a first category or a second category within the security domain that the given exception handling routine will be executed in. Then, when triggering the state saving operation, the exception control circuitry is arranged to trigger saving the data from the first subset of registers when the given exception handling routine is of the first category, and is arranged to trigger saving the data from both the first subset and the second subset of registers when the given exception handing routine is of the second category. The data may be saved in a variety of ways, but in one example implementation is saved onto a stack in memory, and hence such a saving operation may be referred to herein as "stacking". Further, a subsequent restoring of that data into the registers may be referred to as "unstacking".

Such an approach can provide significant performance benefits within a system that supports the use of both trusted and untrusted exception handling routines. For example, the first category can be used to indicate an exception handling routine that is trusted, whilst the second category is used to indicate an exception handling routine that is to be treated as untrusted. Depending on the form of configuration information used, it may be possible in some instances that a trusted exception handing routine is identified as being in the second category, and hence treated as untrusted. However, this causes no security risks, and will merely mean that the exception control circuitry also saves the data from the second subset of registers in a situation where it may in fact not be needed.

By identifying untrusted exception handling routines as being in the second category, this can ensure that the exception control circuitry hardware is responsible for saving the state of not only the first subset of registers but also the second subset of registers. This can significantly reduce the tasks required by the earlier-mentioned trusted wrapper software that may be used in association with an untrusted exception handling routine, and thereby can significantly reduce the interrupt latency in handling such untrusted exception handling routines. In some implementations the hardware state saving of the registers may be at least partially performed in parallel with other exception entry tasks, such as fetching the address of the exception handler, and fetching the first instruction of the exception handler to be executed. Such implementations can have significant interrupt latency advantages over systems where the state saving must be done by the exception handler itself.

Furthermore, by ensuring that the exception control circuitry hardware does not merely always trigger saving the state from both the first subset registers and the second subset of registers, this avoids any performance impact in respect of trusted exception handling routines. In particular, for trusted exception handling routines that are identified as being in the first category, the exception control circuitry merely continues to trigger saving the data from the first subset of registers and thus does not trigger saving the data from any further registers that are not required to be saved given that the exception handling routine is trusted. Such an approach hence maintains the speed of trusted exception handling routines, whilst reducing the latency associated with untrusted exception handling routines by allowing the exception control hardware to save state that would otherwise need to be saved by software.

In one example arrangement, at least when the given exception handling routine is of the second category, the exception control circuitry is further arranged to trigger clearing of the registers whose data is saved during the state saving operation, prior to triggering the processing circuitry to execute the given exception handling routine. As discussed earlier, if an exception handling routine is categorised as being in the second category, then it is treated as untrusted, and accordingly it is appropriate for the exception control circuitry not only to trigger saving the state of the registers that existed in the background processing, but also to trigger clearing of the contents of those registers so that those contents are not visible to the exception handling routine when the processing circuitry begins executing that exception handling routine. If desired, for example to simplify operation, the exception control circuitry can be arranged to always trigger clearing the contents of any registers that are saved, and hence for example could also trigger clearing of the contents of the first subset of registers when saving their state prior to transitioning the processing circuitry to execute an exception handling routine of the first category.

There are a number of ways in which the processing circuitry can be arranged to execute an untrusted exception handling routine. However, in one example implementation the processing circuitry is operable in an unprivileged state and a privileged state, and the processing circuitry is operable to execute, whilst in the unprivileged state, at least a main body of the exception handling routines that are untrusted. Hence, for example, the earlier-mentioned wrapper software may be executed by the processing circuitry whilst in the privileged state, and then the processing circuitry may transition to the unprivileged state in order to execute the main body of the untrusted exception handling routine. Irrespective of whether the background processing was in the privileged state or the unprivileged state, the earlier-described techniques will ensure that the main body of the untrusted exception handling routine does not have access to the data that was stored in any of the registers during background processing, since the exception control circuitry will have triggered saving the state of both the first subset and the second subset of registers prior to triggering the processing circuitry to execute such an untrusted exception handling routine. In some implementations protecting unprivileged background state from an unprivileged exception handler can be an important security property as the background state and the exception handler may belong to different, mutually distrustful, software processes.

The configuration storage can be organised in a variety of ways, but in one example is arranged to store, for one or more exception handling routines, a corresponding item of configuration information. In one particular example implementation, for each exception handling routine a corresponding item of configuration information may be provided. However, alternatively, as mentioned earlier, the category of one or more specific exception handling routines may be effectively hardwired, for example fault handlers or supervisor calls (SVCs), and in those cases the configuration information may not need to be referred to in order to determine the category of the exception handling routine. Such fault handlers and supervisor call exceptions may be associated with the operating system, and therefore may always be trusted and treatable as being part of the first category.

Within such an implementation where, for one or more exception handling routines, a corresponding item of configuration information is stored in the configuration storage, that configuration information can take a variety of forms. However, in one example implementation, the item of configuration information is set to a first value to indicate that the corresponding exception handling routine is trusted and is set to a second value to indicate that the corresponding exception handling routine is treated as untrusted. Hence, with reference to the relevant item of configuration information in the configuration storage, the exception control circuitry can readily determine whether a given exception handling routine is of the first category or the second category, and hence perform the appropriate state saving operation in respect of the contents of the registers.

However, it is not a requirement that the configuration storage stores a corresponding item of configuration information for individual exception handling routines. For instance, in some implementations a very large number of exception handling routines may be supported, and hence the size requirements for such a configuration storage could be large. In order to seek to reduce the storage requirements, in one example implementation an alternative form of configuration information is stored, that can be referenced when assessing, for any exception handling routine, whether that exception handling routine is of the first category or the second category. In particular, it was noted that in many systems untrusted exception handling routines are naturally given a lower priority than trusted exception handling routines. Such an approach for example assists in preventing denial of service (DoS) attacks by unprivileged exception handling routines. Hence, in such implementations, the priority information in association with an exception can be used as a proxy to infer whether the associated exception handling routine is trusted or untrusted. Accordingly, in one such example implementation the configuration storage is arranged to identify a threshold priority, and each exception has an associated priority. The exception control circuitry can then be arranged to determine whether the given exception handling routine is of the first category or the second category dependent on a comparison of a value derived from the associated priority of the given exception and a value derived from the threshold priority. This provides a significantly reduced storage requirement in respect of the configuration storage, since a single piece of information, namely the threshold priority, can be stored, and then used when assessing each exception. Further, it is common for systems that process exceptions to attribute different priorities to those exceptions, and hence the priority information for each exception already exists. In another implementation the threshold priority might be fixed and the configuration store is made up of the priority fields associated with each exception.

In one example arrangement, the exception control circuitry is arranged to determine that the given exception handling routine is of the second category when the associated priority of the exception is less than the threshold priority. It should be noted that, dependent on implementation, a higher priority exception may be attributed a higher numerical priority value, but in an alternative implementation a higher priority exception may be attributed a lower numerical priority value. Hence, for example, in such a latter implementation an exception having a priority of 2 may be considered a higher priority interrupt than an exception having a priority of 4.

As mentioned above, priority can often be used as a good proxy for whether an exception handling routine is to be trusted or untrusted. If through setting of the threshold priority a situation arises where there is a low priority exception that triggers a trusted exception handling routine, then the treating of that exception handling routine as untrusted does not give rise to any problematic behaviour, and merely has a slight performance impact due to the second subset of registers having their state saved by the exception control circuitry hardware in a situation where that was not in fact necessary. Since this situation only occurs for low priority handlers it is likely that this small performance impact will not be important. Further, in the rare event that there is a high priority exception that is actually associated with an untrusted exception handling routine, then this can be dealt with by arranging that the trusted wrapper software provided in association with that exception handling routine is arranged to save the state of the second subset of registers, and to clear that state from the registers prior to transitioning to the untrusted main body of the exception handling routine.

In one example implementation, the exception control circuitry is arranged to set a status flag to identify whether the data from the second subset of registers has been saved. There are a number of ways in which the status flag can be set. For example, in one implementation the status flag is provided as an additional bit within the link register used to capture the exception return address on exception entry. In some implementations portions of the address space are reserved and not executable. Branching to an address in such portions of the address space can therefore be used to signal special conditions, like a request for the hardware to perform an exception return to the background state. In one example implementation, on entry to an exception, the exception return address captured in the link register can be set to a dummy return address specifying an address within the reserved, non-executable, address space, with the actual return address instead being saved on a stack, and then the status flag can be included along with dummy return address in the link register.

Hence, at the time the exception is taken, and the exception control circuitry hence categorises the associated exception handling routine in order to decide whether only the first subset, or both the first subset and the second subset, of registers are to be subjected to the state saving operation, an indication can be added into the link register to identify whether the second subset of registers have had their state saved. It should be noted that the location of this status flag may then move over time, for example that information may be moved out of the link register on to a stack in memory, possibly via other registers in the meantime. However, whenever the status flag is saved, the value of that status flag can be referred to in due course by the exception control circuitry when taking steps to determine whether the contents of the second subset of registers need to be stacked or unstacked.

Further, it should be noted that there are a number of ways in which the status flag can identify whether the data from the second subject of registers has been saved by the exception control circuitry. For example, it could directly encode that information. However, in an alternative arrangement, the status flag value may be used to identify whether there has been any deviation from some default state saving rules, so that again the exception control circuitry can refer to that value when determining whether the data in the second subset of registers has been subjected to a previous state saving operation or not.

There are a number of instances where it can be useful for the exception control circuitry to make reference to the status flag. For example, the exception control circuitry may be arranged on an exception return to reference the status flag in order to determine whether the state of the second subset of registers needs to be restored (unstacked). Hence, when returning to background processing, if the status flag indicates that the second subset of registers have been subjected to the state saving operation, then the exception control circuitry can be arranged to trigger not only restoring the state of the first subset of registers but also the state of the second subject of registers.

When the data in the registers is subjected to the earlier-mentioned state saving operation by the exception control circuitry, there are a number of places in which the current data content of the registers can be saved. However, in one example arrangement the exception control circuitry is arranged, when triggering the state saving operation, to cause the data to be saved to a stack data structure, for example a stack in memory. Typically a stack pointer will be maintained to identify a specific location within such a stack, such as the top of stack location, and that stack pointer can be used when adding new data to the stack, or when retrieving data from the stack. In other implementations the stack may be a descending stack where the top of the stack is at a lower address in memory than the bottom of the stack.

In addition to the handling of exceptions that are taken from background processing, the apparatus is also arranged to handle tail-chained exceptions, a tail-chained exception being an exception that occurs whilst a current exception handling routine is already in the process of being executed, and where that tail-chained exception is of a lower priority than the current exception being processed by the current exception handling routine, and as a result is not handled until the current exception handling routine has finished. However, rather than returning to background processing only to then take an exception to handle the tail-chained exception, instead the apparatus can be arranged to transition directly from completion of the current exception handling routine into the processing of a further exception handling routine in order to process the tail-chained exception. Alternatively the two exceptions may occur at the same time and the exception handling circuitry may be arranged to trigger processing of the higher priority exception before tail-chaining into the lower priority exception when the higher priority exception handler finishes. Irrespective of when the exception to be tail-chained is pended, tail-chaining may be seen as entering a pending exception when a exception handler returns, instead of returning to processing the background code.

Hence, in response to a tail-chained exception corresponding to a further exception handling routine, to be executed after the given exception handling routine has been executed and before returning to the background processing, the exception control circuitry may be arranged to determine with reference to the configuration information whether the further exception handling routine is of the first category or the second category. Then, when the exception control circuitry determines that the further exception handling routine is of the second category and the data from the second subset of registers has not already been saved, the exception control circuitry may be further arranged to trigger saving the data from the second subset of registers before triggering the processing circuitry to execute the further exception handling routine. There are a number of ways in which the exception control circuitry can determine whether the data from the second subset of registers has already been saved, for example it may refer to the earlier-mentioned status flag.

As with the way in which the exception control circuitry may be arranged when handling an exception from background processing, the exception control circuitry may be further arranged to trigger clearing of the registers whose data is saved, before triggering the processing circuitry to execute the further exception handling routine for the tail-chained exception. In some implementations the clearing of the registers may occur when tail-chaining even if no registers have been saved whilst transitioning to the tail-chained exception. For example if the entry to a previous exception, or combination of exceptions, has caused both the first subset and second subsets of the registers to be saved, then there may to no need to save the registers again. However in such cases the registers may still need to be cleared so that values left in the registers by one exception handler are not exposed to the next exception handler.

By maintenance of the earlier-mentioned status flag, significant performance improvements can also be achieved when handling tail-chained exceptions, by avoiding unnecessary resaving of the state of the second subset of registers in situations where that state has already been saved. In particular, the exception control circuitry may be further arranged to reference the status flag, such that when the exception control circuitry determines that the further exception handling routine for the tail-chained exception is of the second category, the exception control circuitry is arranged to skip triggering saving the data from the second subset of registers when the status flag indicates that that data has already been saved. Such an approach can hence lead to a very efficient implementation.

The background processing can take a variety of forms, for example, it may comprise execution of program code other than an exception handling routine, and in such situations the earlier-mentioned given exception is an initial exception. However, alternatively, or in addition, the background processing may comprise execution of a current exception handling routine, and the given exception may be a pre-empting exception of higher priority than the exception corresponding to the current exception handling routine. In such a scenario, the processing of the current exception handling routine will be interrupted so as to enable the higher priority exception to be handled, and in that instance the current exception handling routine is treated itself as background processing, and the earlier-discussed mechanism of categorisation of the exception handling routine that is to be triggered (i.e. that associated with the pre-empting exception) is performed in order to decide whether only the first subset of registers, or the first and second subset of registers, are to be subjected to the state saving operation in order to save the relevant state associated with the current exception handling routine.

In one example implementation, the processing circuitry is arranged to execute the program code in one of a plurality of security domains comprising at least a secure domain and a less secure domain. The exception control circuitry is then arranged to determine with reference to the configuration information whether the given exception handling routine is of the first category or the second category independent of whether any change in security domain will occur when transitioning from the background processing to execution of the given exception handling routine. Thus, the way in which an exception handling routine is categorised is not dependent on whether there is any change in security domain occurring when transitioning from the background processing to that exception handling routine. In one example implementation, there may be different banked versions of the configuration information for each security domain, so that when assessing the given exception handling routine, the domain in which the processing circuitry will execute that exception handling routine may influence the configuration information. However, the categorisation is entirely independent of the security domain associated with the background processing, and hence independent of whether there will be any change in security domain by virtue of taking the exception from background processing.

As mentioned above, the configuration storage may be arranged to store, for each security domain, configuration information used to categorise the plurality of exception handling routines associated with that security domain. Whilst some exception handling routines may be able to be executed in multiple security domains, some exception handling routines may only be executable in a specific security domain, and hence the configuration storage only needs to maintain configuration information in association with such an exception handling routine for the security domain in which it will be executed. This can be useful in implementations where separate configuration information is provided for each exception handling routine, as it avoids the need to provide a configuration bit for each exception handling routine in each security domain.

However, in an alternative implementation as discussed earlier, configuration information is not in fact provided for each exception handling routine, and instead a generic piece of information such as a threshold priority is provided, and in such instances the configuration storage may provide a threshold priority for each security domain, so that the relevant threshold priority is referenced taking into account the security domain in which the given exception handling routine will be executed.

In summary, however the configuration information is arranged within the configuration storage, in the presence of a system supporting multiple security domains, the exception control circuitry may be arranged to determine whether the given exception handling routine is of the first category or the second category with reference to the configuration information provided for the security domain in which the given exception handling routine is to be executed.

In situations where the processing circuitry may execute the program code in multiple different security domains, then within a given security domain the processing circuitry may be arranged to perform data processing in one of a plurality of states, including an unprivileged state and a privileged state. In some implementations the processing circuitry may be operable in a plurality of modes, including a handler mode for executing exception handlers and a thread mode. Execution in the handler mode may always be in a privileged state, and whether execution in the thread mode is in a privileged or unprivileged state may depend on a configuration value.

In implementations where the processing circuitry is arranged to execute the program code in multiple different security domains, then the exception control circuitry can also be arranged to perform additional checks when deciding the registers whose data needs to be saved prior to triggering execution of an exception handling routine. For instance, in order to ensure that the security of the secure domain is not compromised, then independently of the above-mentioned checks that seek to categorise the exception handling routine based on configuration information in the configuration storage, the exception control circuitry can also take into account transitions in security domain when determining whether the data in the second subset of registers needs to be saved. In particular, the exception control circuitry may be further arranged, in response to identifying an exception that is a first exception to cause a transition from the secure domain to the less secure domain in a situation where the background processing was performed by the processing circuitry in the secure domain, to trigger saving the data from the second subset of registers and clear the registers before triggering the processing circuitry to execute an exception handling routine corresponding to that identified exception. Such an approach can ensure that the data of the secure domain is not unintentionally made available to an exception handling routine operating in the less secure domain.

The identified exception that is the first exception to cause a transition from the secure domain to the less secure domain in a situation where the background processing was performed by the processing circuitry in the secure domain may take a variety of forms. For example, it could be the earlier-mentioned given exception that is causing a transition from the background processing, or alternatively could be a tail-chained exception. For instance, it may be that the given exception that caused a transition from background processing was also handled in the secure domain, and it was a subsequent tail-chained exception that is then handled in the non-secure domain, and hence becomes the first exception to cause a transition from the secure domain to the less secure domain.

In such an implementation where the exception control circuitry can perform additional checks in order to decide whether to save the data from the second subset of registers, the exception control circuitry can be further arranged to reference the earlier-mentioned status flag, such that in response to the identified exception the exception control circuitry can be arranged to skip triggering saving the data from the second subset of registers when the status flag indicates that the data has already been saved. Hence, again the use of the status flag can ensure improved efficiency when handling the saving and restoring of the state of the various registers during the handling of exceptions.

Particular examples will now be described with reference to the Figures.

FIG. 1 schematically illustrates an example of a data processing system 2 including processing circuitry 4 for performing data processing in response to instructions fetched from a memory system 26. The memory system 26 may include caches (e.g. one or more levels of data caches and/or instruction caches) as well as main memory. In some larger systems the main memory may comprise a single type of memory, for example DRAM, and in some small systems (for example, microcontrollers) the main memory may comprise different types of memory, such as Flash memory for storing program code and constant values, and SRAM for storing the stack and other values that change during execution. The processing circuitry 4 has a processing pipeline comprising a number of pipeline stages including, for example, a fetch stage 12 for fetching the instructions to be executed from the memory system 26, a decode stage 14 for decoding the fetched instructions to generate control signals for controlling the remaining pipeline stages to perform the data processing, and an execute stage 16 for executing the decoded instructions to perform data processing operations. Registers 6 are provided for storing source data (source operands) for access by the processing circuitry 4 when executing instructions and for storing result data (destination operands) generated by execution of those instructions. Further, control registers 18 may be provided for storing control information used to control operation of the processing circuitry 4.

It will be appreciated that the pipeline stages shown in FIG. 1 are a simplified representation, and other types of pipeline stages could also be provided, such as a rename stage for performing register renaming, an issue stage for queueing instructions awaiting execution and issuing them for execution when their required source operands are available, and a write back stage for handling commitment of instructions and writing back results to the registers 6. The pipeline could be an in order or out of order pipeline.

Whilst the processing circuitry is executing program code, one or more exceptions may occur in order to cause corresponding exception handling routines to be executed. When an exception causes background processing to be temporarily halted, so as to allow a corresponding exception handling routine to be executed, then it is typically necessary to save at least some of the data currently stored in the registers 6 in association with the background processing, so that that data can later be restored into the registers when the processing circuitry returns to performing the background processing. Such data can be saved for later use in a variety of ways, but in one example arrangement is stored onto a stack 28 within the memory system 26.

Exception control circuitry 30 is provided for controlling the taking of exceptions. In response to a given exception, the exception control circuitry is arranged to cause performance of a state saving operation to save data from the registers 6, before triggering the processing circuitry 4 to execute a given exception handling routine corresponding to the given exception. As will discussed in more detail herein, exactly which registers have their state saved to a stack 28 (such a save operation also be referred to herein as a stacking operation) in response to the exception control circuitry 30 will depend on how the given exception handling routine is categorised by the exception control circuitry 30, and to assist the exception control circuitry 30 in this categorisation process, the exception control circuitry 30 has access to a configuration storage 32 storing configuration information used to categorise the exception handling routines. As shown in FIG. 1, in some implementations the exception control circuitry may have direct access to the registers and the memory hierarchy. However in other implementations the exception control circuitry may perform the state saving indirectly by triggering the processing circuitry to perform the state saving on its behalf. This way the number of connections to the registers and memory hierarchy may be minimised, saving circuit area and power.

As shown in FIG. 1, the registers 6 can be considered to comprise a first subset of registers (referred to herein as caller registers 8) and a second subset of registers (referred to herein as callee registers 10) non-overlapping with the first subset. By default, the exception control circuitry 30 will take responsibility for saving (stacking), either directly or indirectly, the caller registers when handling an exception from background processing, whilst the saving (stacking) of the callee registers will be the responsibility of the given exception handling routine executed by the processing circuitry in response to the given exception.

However, as mentioned earlier, the system described herein supports the execution of not only trusted exception handlers, but also untrusted exception handlers, and when executing an untrusted exception handler it is necessary for the state of all of the registers (both caller and callee) to be saved to the stack 28, and cleared from the registers, before executing the untrusted exception handler code so as to ensure that the untrusted exception handler code does not have access to data belonging to the background processing. Trusted wrapper software can be used on entry to and exit from the untrusted exception handler code in order to perform any required steps to ensure that the untrusted body of the exception handler code does not have access to data that it should not have access to, and hence for example can be used to save and clear the callee registers associated with background processing. However, interrupt latency is becoming a significant issue, and the performance of such steps using wrapper software can significantly increase interrupt latency for such untrusted exception handler code.

As will be discussed in more detail herein, to alleviate this issue the exception control circuitry 30 is arranged to determine, with reference to configuration information in the configuration storage 32, whether the given exception handling routine associated with the given exception is trusted, or is to be treated as untrusted. In the event that the given exception handling routine is to be treated as untrusted, then the exception control circuitry hardware 30 can be arranged to save not only the caller registers, but also the callee registers, and to clear the contents of any saved registers prior to triggering the processing circuitry to execute the given exception handling routine. This can significantly reduce interrupt latency for such untrusted exception handling routines by avoiding the need for the saving and clearing of the registers to be performed by the trusted wrapper software. Further, by using the configuration information to seek to distinguish between trusted exception handling routines and exception handling routines to be treated as untrusted, this ensures that the exception control circuitry 30 does not always need to save the state of all of the registers, and can continue for trusted exception handling routines to only save the caller registers, thus avoiding any performance impact on such trusted exception handling routines (which often can be time critical routines).

The above described technique can be employed in a variety of systems. For example, it could be employed within a system that operates in a single security domain, but with the processing circuitry being able to operate in both privileged and unprivileged states, and with the configuration information enabling the exception control circuitry to seek to categorise exceptions so as to treat as untrusted those exception handling routines whose bodies are to be executed by the processing circuitry in the unprivileged state. Alternatively, it could be employed within a system that has a secure domain and a less secure domain, and only a single processing state in each security domain, where the configuration information may enable the exception control circuitry to seek to categorise exceptions so as to treat as untrusted those exception handling routines executed by the processing circuitry in the less secure domain.

However, for the purposes of the examples discussed herein, a system will be considered where the processing circuitry is able to operate in multiple security domains, including a secure domain and a less secure domain, and where within each security domain the processing circuitry is able to operate in a plurality of processing states, including an unprivileged state and a privileged state. Configuration information can then be specified that is used to categorise the given exception handling routine within the security domain that given exception handling routine will be executed in. The configuration information can thus vary between the secure domain and the less secure domain, but within any particular security domain the configuration information can be used to seek to distinguish between exception handling routines that are trusted and those that are to be treated as untrusted (for instance, as per the example given earlier any exception handling routine whose body is to be executed whilst the processing circuitry is in the unprivileged state may be considered untrusted).

In such a system 2, the system may also include memory access checking circuitry 20 for checking whether accesses to the memory system 26 are permitted based on attribute data specified for various regions of a memory address space. The memory access checking circuitry may include a security attribute unit (SAU) 24 for storing security domain defining data which defines a security domain associated with each respective region of the memory address space. Based on the security attribute data, the security attribute unit 24 may check whether a memory access is allowed depending on a current security domain of operation of the processing circuitry and on the security domain associated with the region including the target address of the memory access. In other implementations the SAU 24 may not directly store the security domain defining data, but instead may access security domain defining data stored elsewhere in order to perform the memory access checks. In some systems the security domain defining data may be stored in the memory system 26, or may be stored in configuration registers elsewhere in the system 2.

The processing circuitry 4 may operate in a current security domain of operation, which may generally correspond to the security domain associated with the address of the instruction currently being executed (although there may be some exceptions, e.g. when handling transitions between domains). When an instruction branches from an address in a region specified by the SAU 24 as being in one domain to an address in a region associated with a different domain, this may trigger a transition of the current security domain in which the processing circuitry 4 is operating. In other implementations such a branch may not directly trigger a transition of the current security domain, but instead trigger additional security checks, such as whether a gateway instruction is present. In these implementations it may be the gateway instruction itself that triggers the change in the current security domain. For some other types of security domain transition a special branch instruction may be used to branch to executing instructions at an address specified by the instruction, and in a different security state. In general, while operating in a secure domain, the processing circuitry may have access to data in memory regions associated with both the secure domain and a less secure domain, whilst when operating in the less secure domain the processing circuitry may have access to the data in regions associated with the less secure domain but may not be permitted to access data in regions of the address space which the SAU 24 specifies as being associated with the secure domain. This enables protection of sensitive data against unauthorised access from code operating in the less secure domain.

Also, the memory access checking circuitry may include a memory protection unit (MPU) 22 which checks whether memory accesses to the memory system 26 satisfy access permissions which may specify, for example, which privilege levels of the processing circuitry 4 are allowed to access a given region of memory, or may specify whether a memory region of the address space can be accessed by both read and write operations or is a read only region for which writes are prohibited. The access permissions used by the MPU 22 may for example be specified by a more privileged process (such as a hypervisor or an operating system) to control which regions of memory a less privileged process (such as an application) is allowed to access, and how (read only or read/write). The permissions provided by the MPU 22 may be orthogonal to those provided by the SAU 24, so that for a given memory access to be allowed, it should pass the checks based on the access permissions defined for both the MPU 22 and the SAU 24. Although the MPU 22 is shown as a single entity in FIG. 1, in some examples separate secure and less secure MPUs 22 may be provided, each associated with one of the security domains, so that different memory access permissions can be specified for a given region of memory depending on whether the current domain is the secure domain or the less secure domain (e.g. a region could be read only in the less secure domain but both readable and writable in the secure domain).

Hence, as shown in FIG. 2, the processing circuitry 4 may support performing data processing in one of a number of security domains including at least a secure domain (S) and a less secure domain (LS). Although FIG. 2 shows a system with only two security domains, it would be possible to provide three or more domains associated with different levels of security.

Also, within a given security domain, as shown in FIG. 2 the processing circuitry may perform data processing in one of a number of modes, including a handler mode (H) and a thread mode (T). The handler mode is typically used for exception processing, and hence for example a trusted exception handling routine may be executed in the handler mode. The thread mode is typically used for running different threads, for example different application threads. However in addition the body of an untrusted exception handling routine could be executed as a thread in thread mode, in one example implementation the associated wrapper code being executed in the handler mode. When operating in the handler mode H then the processing circuitry 4 may by default be assumed to have a more privileged mode of operation so that access to memory and control registers is controlled according to a certain level of privilege level other than the less privileged level, while in the thread mode T the processing circuitry may have one of a number of different privilege levels depending on other architectural state stored in control registers.

Hence as shown in FIG. 2, the combination of the security domain and the mode in which the processing circuitry 4 is operating may determine aspects of how processing is carried out by the processing circuitry 4. FIG. 2 shows four different combinations of these modes, including:
  a secure thread mode (shorthand for the combination of the secure domain and the thread mode)
  a less secure thread mode (combination of the less secure domain and the thread mode)
  a secure handler mode (combination of the secure domain and the handler mode) and
  a less secure handler mode (combination of the less secure domain and the handler mode).

The configuration information provided within the configuration storage 32 can take a variety of forms. FIG. 3A illustrates an example where separate configuration information is provided for each of at least a subset of the possible exception handling routines. In one example implementation, an entry may be provided for every exception handling routine, but in other implementations it may be the case that the categorisation of one or more particular exception handling routines is predetermined, and accordingly does not need capturing within an entry of the configuration storage. For example, certain important exceptions may always be viewed as being of the first category, and accordingly the exception control circuitry 30 can make that determination based on the type of exception itself without needing to refer to the configuration information in the configuration storage.

For each exception handling routine for which corresponding configuration information is provided in the configuration storage, an entry within that configuration storage 30 will be allocated having a first field 35 used to identify the exception handling routine, and a second field 40 used to identify whether that exception handling routine is of the first category or the second category. In other implementations the column second field 40 may be indexed by the exception number, and therefore separate storage for the first field 35 may not be needed. The information provided in this field 40 can take a variety of forms, but in one example it is a single bit field which is set to identify when the exception handling routine is of the second category, and is cleared when the exception handling circuitry is of the first category. Hence, in such an implementation, when the field 40 is set this indicates that the exception control circuitry 30 is to save all of the register state rather than merely the caller registers.

In implementations where there are multiple security domains, then the configuration storage can be replicated for each security domain. It will however be appreciated that some exception handling routines may be specific to a certain security domain, and accordingly an entry for such an exception handling routine only needs to be made within the table of exception handling routines maintained for the relevant security domain. In some implementations there may be exceptions which can be configured to target either the secure or less secure domain. In such cases replicating the configuration storage for these exceptions may be wasteful, as only one of the configuration storage replicated fields 40 will be used (which one being dependent on the target security domain of the exception). In such implementations only a single field 40 may be provided per exception with a configurable target security domain, and instead access to the field 40 for a given exception may be prohibited from the less secure domain if the exception is configured to target the secure domain.

Figures 3B, 3C:
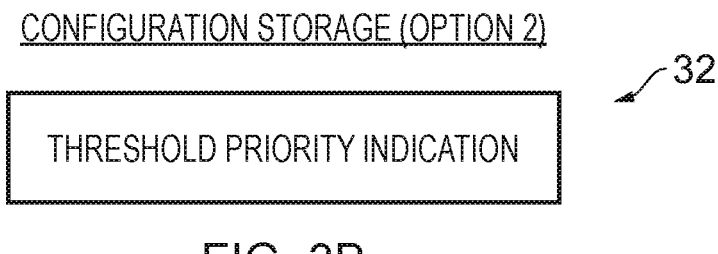

In some instances there may be a large number of different exception handling routines supported by the system, and in such instances the size of the configuration storage 32 required to capture the configuration information for each exception handling routine may be relatively large. However, in some implementations, a more efficient form of configuration storage can be utilised. For instance, in one example implementation it is a case that the untrusted exception handling routines are typically allocated a lower priority than the trusted exception handling routines, and accordingly the priority level of the associated exception can be used as a proxy for an indication of whether the exception handling routine should be treated as trusted or untrusted. In such situations, the configuration storage 30 can be arranged to store a threshold priority indication as shown in FIG. 3B. Different threshold priorities can be indicated for each security domain in implementations where there are multiple security domains. Hence, when considering a transition from background processing to a given exception handling routine indicated by an associated given exception, then the priority of the given exception can be compared against the threshold priority indication within the configuration storage 32 in order to determine whether the associated exception handling routine should be viewed as being in the first category or the second category. In situations where different threshold priorities are provided for different security domains, then the security domain in which the given exception handling routine will be executed can be taken into account when determining the appropriate threshold priority to be compared against the priority of the given exception.

In accordance with a third example implementation the threshold priority could be fixed and the configuration storage may be arranged as shown in FIG. 3C to store a configurable priority for each exception. Hence, each entry in the configuration storage 32 can be arranged to provide a first field 45 to identify an exception handling routine and a second field 50 identifying the priority of that exception. In other implementations the column second field 50 may be indexed by the exception number, and therefore separate storage for the first field 45 may not be needed. The comments made above in relation to FIG. 3A regarding the need or not to replicate entries for different security domains apply equally to the implementation of FIG. 3C.

In one particular implementation, when the associated priority of the given exception is less than the threshold priority, it will be determined that the associated exception handling routine is of the second category, i.e. is to be treated as an untrusted exception handling routine. As a result, this will trigger the exception control circuitry 30 to trigger saving and clearing of the state of both the caller and callee registers prior to triggering the processing circuitry to execute the given exception handling routine. However, if the priority is the same or greater than the threshold priority, then the exception handling routine will be considered to be of the first category, and the exception control circuitry will merely save (and optionally clear) the state of the caller registers before triggering the processing circuitry to execute the given exception handling routine. In other implementations an exception may be considered to be of the second category (where both the caller and callee registers need to be saved) if the priority of the exception is less than or equal to the threshold. In such systems the exception may be considered to be of the first category if the priority of the exception is greater than the threshold.

In other implementations the priority of the exception to be entered may be modified before it is compared to the threshold. The threshold priority may also be subject to such modification before the comparison. Modifying the priority of an exception may take the form of restricting the priority to be within a certain range, or mapping the priority from one priority range to another. These sorts of priority modification may be useful in systems with multiple security domains to ensure that even the highest priority exception for the less secure domain cannot pre-empt security critical exceptions associated with the secure domain. However, whilst different comparison may be used, and/or various priority modification and remapping schemes applied, it will be appreciated that these do not prevent the modified/remapped priority of an exception being used as a proxy for whether the associated exception handler should be treated as trusted.

Whilst providing a priority configuration field for each exception is quite expensive, this is a process commonly used in modern systems, and hence reusing that existing information for categorising the exception handling routine does not add additional cost, and can hence provide a very efficient mechanism for performing the above-described categorisation.

FIG. 4 is a flow diagram illustrating the handling of an exception from background processing. At step 100, it is determined whether an exception from background processing has occurred. The background processing may for example involve execution of program code other than an exception handling routine by the processing circuitry, for example execution of a particular application thread, in which event the exception is an initial exception from that background processing. However, it can sometimes be the case that the background processing itself is the execution of a particular exception handling routine, and the exception detected at step 100 is a pre-empting exception of a higher priority than the exception corresponding to the current exception handling routine. In that instance, it will be necessary to interrupt the current exception handling routine (thus treated as background processing) in order to execute the exception handling routine required by the higher priority exception detected at step 100.

In situations where an exception from background processing is detected at step 100, then at step 105 the exception control circuitry 30 is arranged to determine with reference to the configuration storage 32 whether the required exception handling routine (i.e. the exception handling routine required to handle the exception detected at step 100) is of the first category or the second category. As discussed earlier, the configuration information maintained within the configuration storage 32 is such that trusted exception handling routines will typically be considered to be of the first category, and any exception handling routines attributed to the second category will be viewed as being untrusted exception handling routines. In implementations where the threshold priority indication is used, then in some instances it may be the case that a trusted exception handling routine is actually of a priority low enough that it is considered as being of the second category and hence is considered to be untrusted. This causes no incorrect behaviour in the operation of the system, but merely incurs a slight performance penalty by causing the callee registers to be saved and cleared in addition to the caller registers. Further, if it were the case that the system provided for a particularly high priority untrusted exception handling routine, then the determination made with reference to the configuration storage may identify that exception handling routine as being of the first category and hence trusted, in which event the exception control circuitry will merely save the caller register state. However, the earlier-mentioned wrapper software provided in the handling mode can then be used to save and clear the callee registers prior to handing over execution to the main body of the untrusted exception handling routine.

At step 110, it is determined whether the required exception handling routine is of the first category, and if so the process proceeds to step 115. In some implementations step 115 will not be required, but in other implementations it may be possible that other checks are also performed by the exception control circuitry 30 in order to determine whether there is any need for the callee registers to be saved. As a particular example, as discussed in commonly owned U.S. Pat. No. 9,202,071, the entire contents of which are hereby incorporated by reference, the exception control circuitry could be arranged to detect situations where the background processing is in the secure domain and the exception handling routine will be executed in the non-secure domain, and in that instance may be arranged to also save the callee registers in addition to the caller registers. In implementations that incorporate that functionality, then that same exception control circuitry 30 can be used to implement the techniques described herein based on categorisation of individual exception handling routines within a particular security domain. As will be apparent from the earlier discussion, such categorisation occurs independently of whether there is any transition in security domain resulting from the taking of the exception.

In the absence of any other check indicating that the callee registers should be saved at step 115, then the process proceeds to step 120 where only the caller registers are saved to the stack 28. In systems employing multiple security domains, different stacks can be provided for each security domain, and the data from the caller registers will be placed on the appropriate stack. Hence, if the background processing is in the secure domain, then the data from the caller registers will be saved on to the secure stack, whereas if the background processing is in the non-secure domain then the data from the caller registers will be saved to the non-secure stack. As indicated by step 120, if desired the exception control circuitry could also optionally clear the caller registers. However, in other instances it may be considered unnecessary to clear the caller registers given that the required exception handling routine has been determined to be of the first category, i.e. is considered trusted. At step 122, a status flag is cleared to identify that only the caller registers have been saved to the stack.

If at step 110 it is determined that the required exception handling routine is of the second category, i.e. is untrusted, then the process proceeds to step 130 where the exception control circuitry 30 is arranged to trigger saving of the data from the caller and the callee registers to the stack, and to cause those registers to be cleared. The registers can be cleared after the state has been saved, or in one implementation each register can be cleared as its data is saved to the stack. As shown in FIG. 4, step 130 can also be reached from the yes path of step 115, i.e. in situations where the required exception handling routine is of the first category, but some other check also performed by the exception control circuitry determines that it is appropriate to save the callee registers. Again, where the system supports execution in multiple security domains, the stack on which the register state is saved will be the stack pertaining to the security domain in which the background processing is being performed.

Following step 130, then at step 135 the status flag is set to indicate that the callee registers have been saved to the stack. There are a number of ways in which the status flag can be set. For example, it can be provided as an additional bit within the information stored within the link register used to indicate the return address to which processing should return after completion of the exception handling routine. In other implementations the information stored within the link registers is an exception return value. The exception return value is a reserved non-executable address which, when branched to, will trigger the exception return process. However, in both cases, the information initially stored in the link register may subsequently be migrated from the link register to other storage structures within the system, and hence for example may end up on one of the stacks within the memory system, or in another register.

Following step 135, or following step 122 in the event that the exception handling routine is of the first category, then at step 125 the exception control circuitry 30 triggers the processing circuitry to execute the required exception handling routine.

Figure 5:
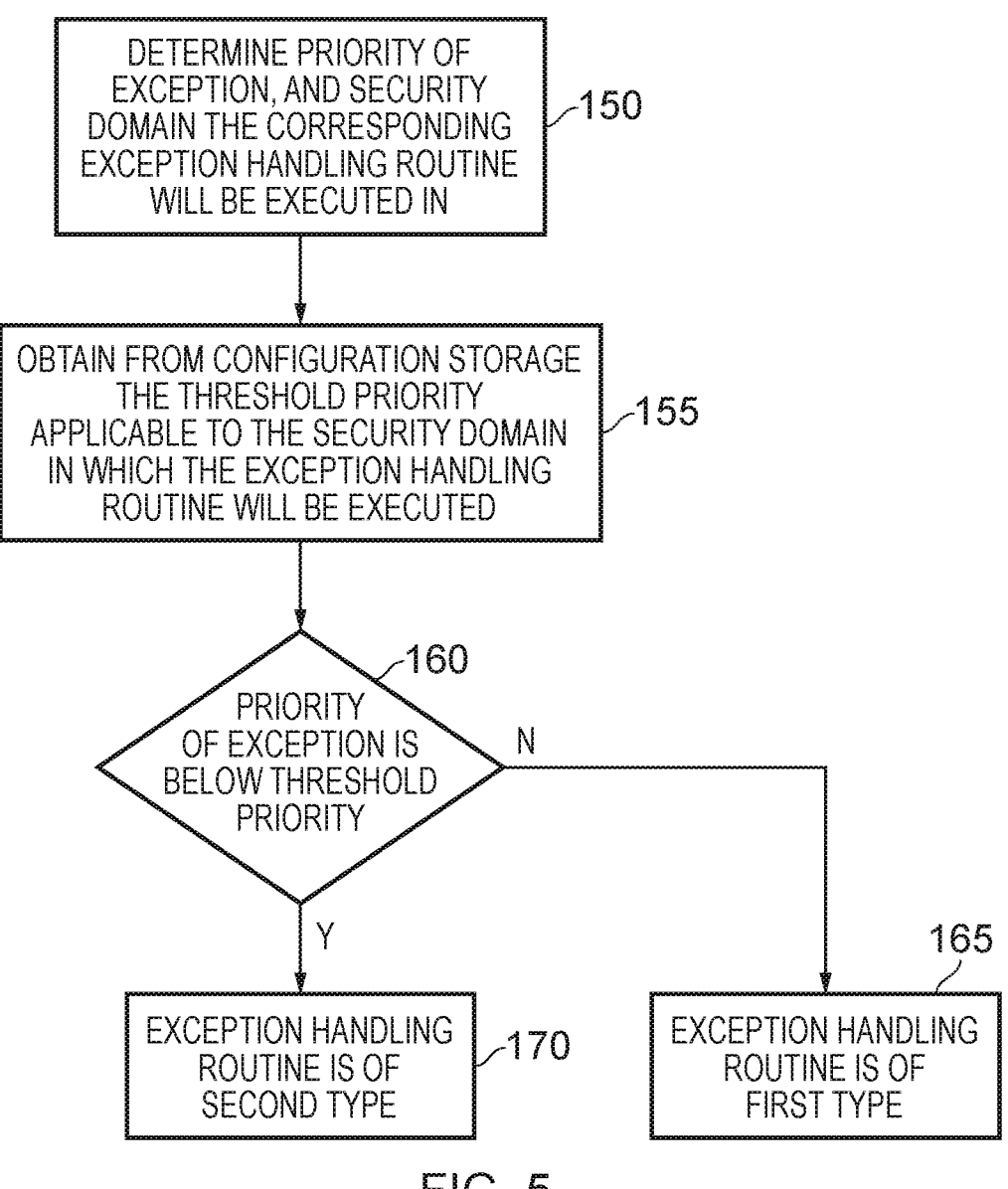
FIG. 5 is a flow diagram illustrating a sequence of steps that can be performed in order to implement step 105 of FIG. 4 in one example implementation.

FIG. 5 is a flow diagram illustrating the performance of step 105 of FIG. 4 in situations where the configuration storage takes the form shown in FIG. 3B, and hence provides a threshold priority indication. At step 150, the priority of the exception detected at step 100 is determined, as is the security domain the corresponding exception handling routine will be executed in.

At step 155, the exception control circuitry then obtains from the configuration storage the threshold priority that is applicable to the security domain in which the exception handling routine will be executed. As mentioned earlier, the configuration storage 32 can if desired store different threshold priorities for each security domain, and hence at step 155 the appropriate threshold priority is determined.

At step 160 it is determined whether the priority of the exception is below the threshold priority, and if not it is determined that the exception handling routine is of the first type at step 165. However, if the priority of the exception is below the threshold priority, then at step 170 it is determined that the exception handling routine is of the second type.

Figure 6:
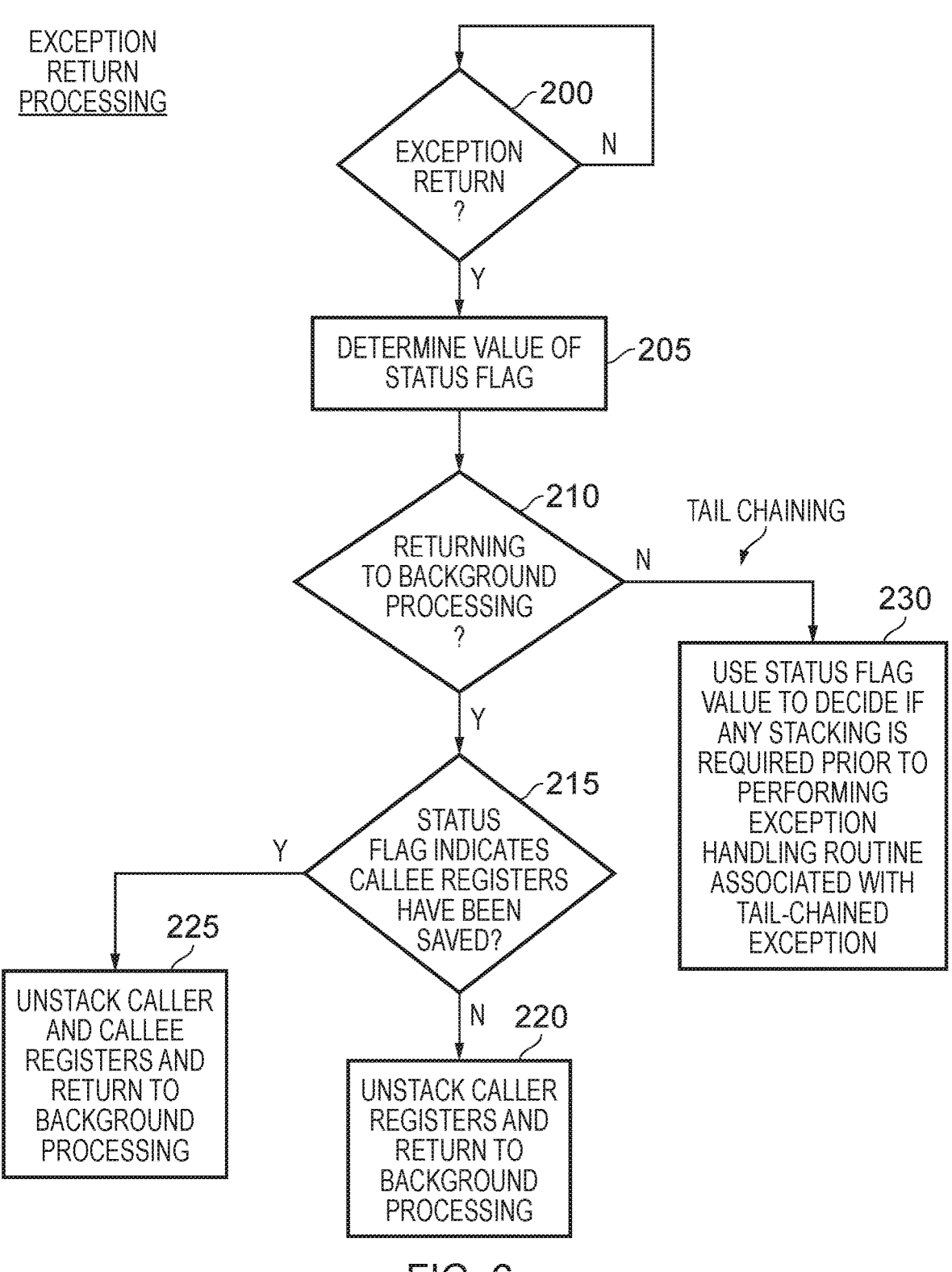
FIG. 6 is a flow diagram illustrating steps performed in order to implement exception return processing in one example arrangement.

FIG. 6 is a flow diagram illustrating exception return processing that is performed on completion of the exception handling routine. At step 200, it is determined whether the exception return point has been reached, i.e. whether handling of the current exception handling routine has completed. In some implementations this may be indicated by branching to a reserved non-executable exception return address, which may contain the earlier mentioned status flag. When that is the case, the process proceeds to step 205 where the value of the earlier mentioned status flag is determined. As mentioned earlier, this may be available within the link register, but in some instances the content of that link register will in the meantime have been transferred elsewhere within the system, for example on to one of the stacks, and accordingly at this stage the relevant information can be retrieved from the stack in order to determine the value of the status flag.

At step 210, it is determined whether the exception return will return to background processing or not. Assuming the processing will return to background processing, then at step 215 it is determined whether the status flag indicates that the callee registers have been saved. In one example implementation, the status flag information will directly identify whether the callee registers have been saved or not. However, in an alternative implementation, the status flag information can encode whether a deviation has occurred from default stacking rules, and through knowledge of that information it can be determined in any particular situation whether the callee registers have been saved.

In the event that the callee registers have not been saved, then the process proceeds to step 220 where the exception control circuitry 30 is arranged to trigger the unstacking of the caller registers, i.e. to obtain from the relevant stack the data that had previously been saved from the caller registers, and to restore that data into the caller registers. At this point, the processing circuitry is then triggered to resume background processing.

If at step 215 it is determined that the callee registers have been saved, then the process proceeds to step 225 where the exception control circuitry 30 is arranged to trigger the unstacking of both the caller and callee registers. Again, this is achieved by reading from the relevant stack the data previously saved in respect of the caller and callee registers and restoring that data into the relevant registers. Again, the processing circuitry is then triggered to return to background processing.

However, it is not always the case that processing will return to background processing on an exception return. In particular, another exception may be pending at that point, this being an exception that is of a lower priority than the exception handling routine that has just been completed, and hence being an exception that did not pre-empt that exception handling routine. Accordingly, if the pending exception has a higher priority than the background processing, rather than returning to background processing merely for another exception to immediately be taken, a tail-chaining mechanism can be employed in order to initiate execution of the pending exception that has been waiting for the current exception handling routine to complete. Hence, if at step 210 it is determined that processing will not be returning to background processing on the exception return, then at step 230 the status flag value is used to decide if any further stacking of the background register content is required prior to performing the exception handling routine associated with the tail-chained exception.

Figure 7:
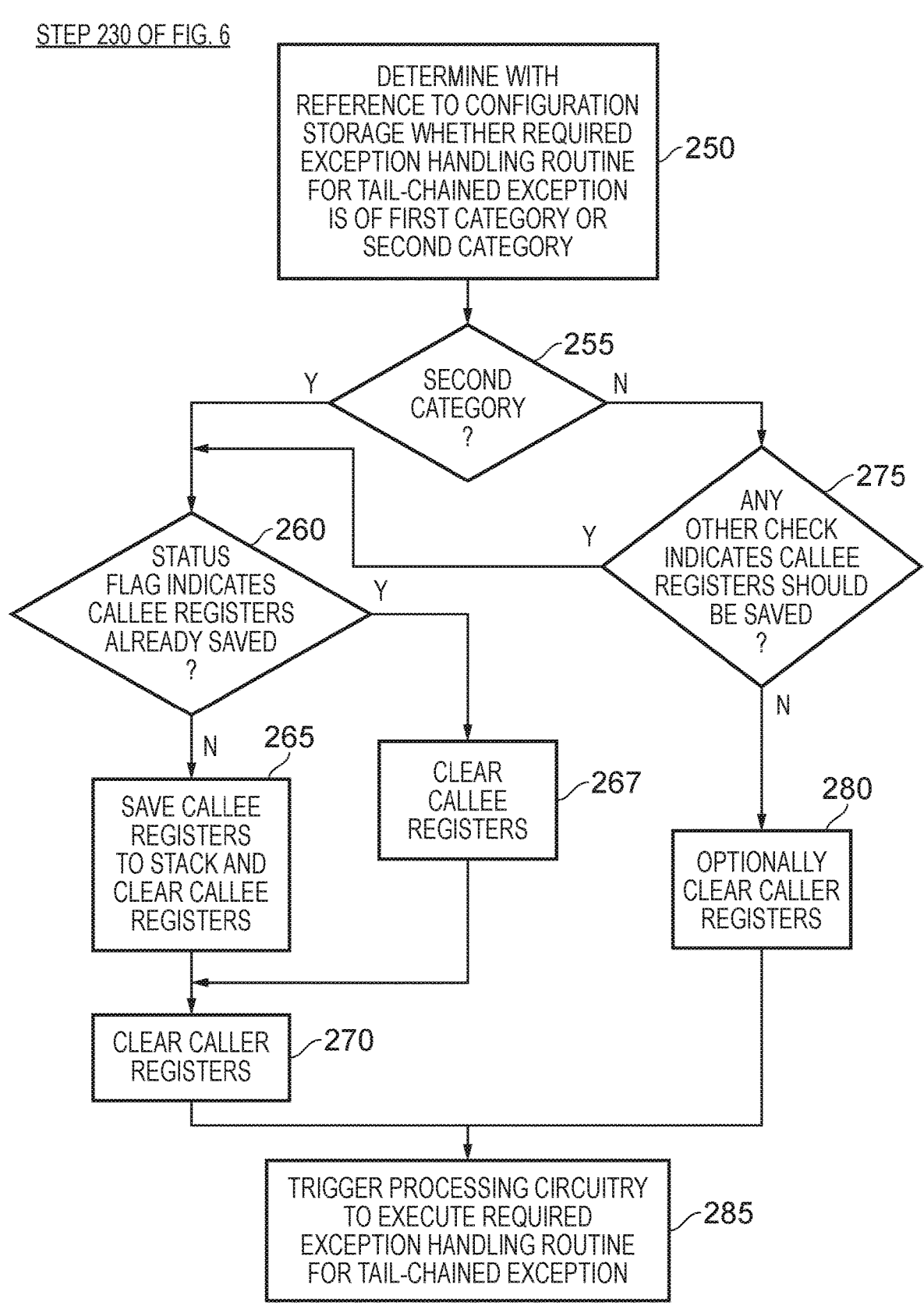
FIG. 7 is a flow diagram illustrating in more detail a sequence of steps performed to implement step 230 of FIG. 6, in one example arrangement.

FIG. 7 is a flow diagram illustrating how a tail-chained exception is handled upon an exception return, and hence illustrates in one example implementation how the process of step 230 of FIG. 6 may be implemented. At step 250, the configuration storage 32 is referenced by the exception control circuitry 30 in order to determine whether the required exception handling routine for the tail-chained exception is of the first category or the second category. At step 255, it is determined whether the tail-chained exception is of the second category, and if so that required exception handling routine is treated as untrusted and the process proceeds to step 260.

At step 260, it is determined whether the status flag indicates that the callee registers are already saved. In particular, since the required exception handling routine is of the second category, and hence treated as untrusted, it is necessary for the callee register state to be saved, but it may be the case that that state has already been saved through the previous actions of the exception control circuitry in response to a previous exception. If it is determined at step 260 that the status flag indicates that the callee registers have not yet been saved, then at step 265 the callee registers are saved to the stack by the exception control circuitry 30, and the callee registers are cleared. In particular, the content of the callee registers will be saved to the stack associated with the security domain in which the background processing was being executed. In addition, at step 270, the content of the caller registers are cleared. The process then proceeds to step 285 where the processing circuitry is triggered to execute the required exception handling routine for the tail-chained exception. If at step 260 it is determined from the status flag that the callee registers have already been saved, then step 265 can be bypassed, and instead the callee registers may merely be cleared at step 267. The process then proceeds to step 270.

It at step 255 it is determined that the required exception handling routine for the tail-chained exception is of the first category, then it is known that the exception handing routine is trusted. Further, since the required exception handling routine is to be performed in response to a tail-chained exception, it is known that the exception control circuitry 30 will have already saved the caller register state to the relevant stack in connection with an earlier exception. Accordingly, no further action is required, other than optionally clearing the caller registers at step 280, and the process can proceed directly to step 285 where the processing circuitry is triggered to execute the required exception handling routine for the tail-chained exception.

However, as mentioned earlier in connection with FIG. 4, in some implementations the exception control circuitry 30 may also perform additional checks in order to determine whether it is required to save the state of callee registers, and hence at step 275 the exception control circuitry may determine whether any other checks indicate that the callee registers should be saved. If so, the process can proceed to step 260, whereas otherwise the process can proceed to step 280.

As an example of an implementation where the exception control circuitry may perform additional checks, in a system that employs multiple security domains, including a secure domain and a less secure domain, then in situations where the background was being processed in the secure domain, and an exception handling routine is to be executed in the less secure domain, it is appropriate for the callee registers to be saved the first time such a less secure exception handling routine is to be executed. It may be that the initial exception taken from background processing relates to an exception to be handled in the secure domain. Hence, when handling a tail-chained exception, it may be appropriate to also check whether the required exception handling routine for the tail-chained exception would be a first exception that causes a transition to the less secure domain in a situation where the background processing was in the secure domain, and in that instance to stack the callee registers if they have not already been stacked, and were not otherwise going to be stacked by virtue of the required exception handling routine for the tail-chained exception being determined to be of the second category.

Figure 8:
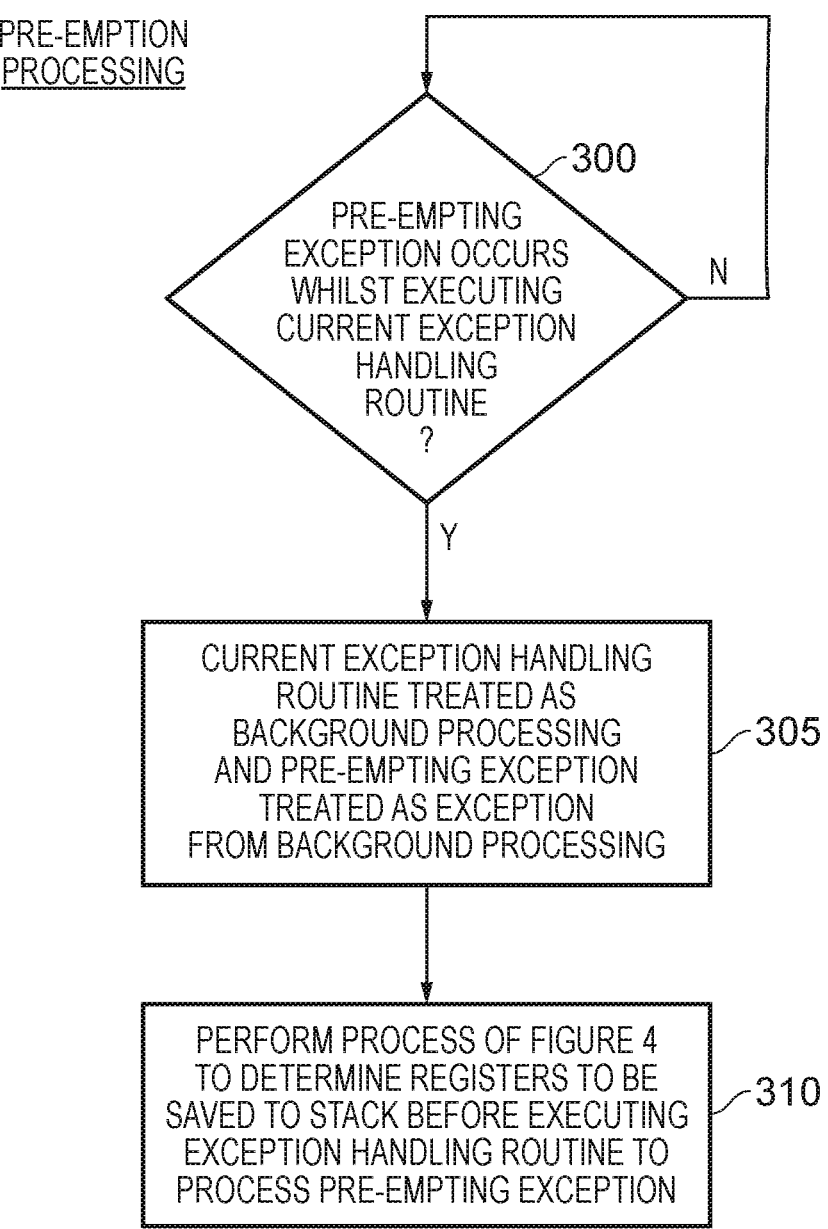
FIG. 8 is a flow diagram illustrating pre-emption processing in one example arrangement.

FIG. 8 is a flow diagram illustrating how pre-emption is handled in accordance with one example implementation. Pre-emption occurs when an exception arises whilst executing a current exception handling routine, in a situation where that newly arriving exception is of a higher priority than the priority associated with the currently executing exception handling routine. Such a higher priority exception that arises during the processing of a current exception handling routine is referred to as a pre-empting exception. If at step 300 a pre-empting exception is detected, then the process proceeds to step 305 where the current exception handling routine is treated as background processing and the pre-empting exception is treated as an exception from that background processing. As a result, at step 310 the earlier-discussed process of FIG. 4 is performed in order to determine the register state to be saved to the stack before executing the exception handling routine to process the pre-empting exception. Hence, there can in effect be nested levels of background processing, with the process of FIG. 4 being implemented each time an exception is taken from such background processing. An example of this will be discussed later with reference to FIG. 9C.

Figure 9A:
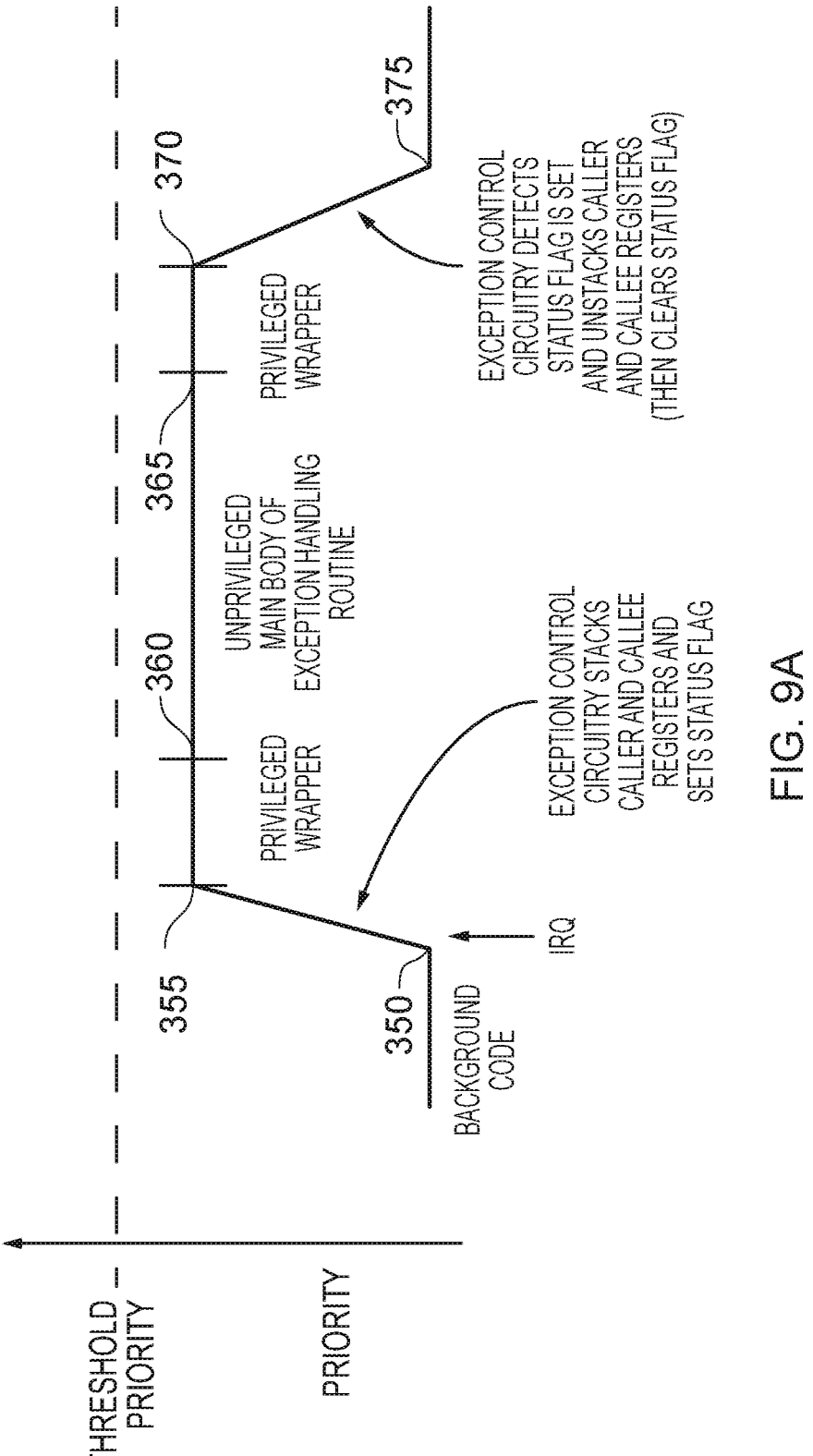
FIGS. 9A to 9C illustrate the handling of the state saving of caller and callee registers for various specific example scenarios.
Figure 9B:
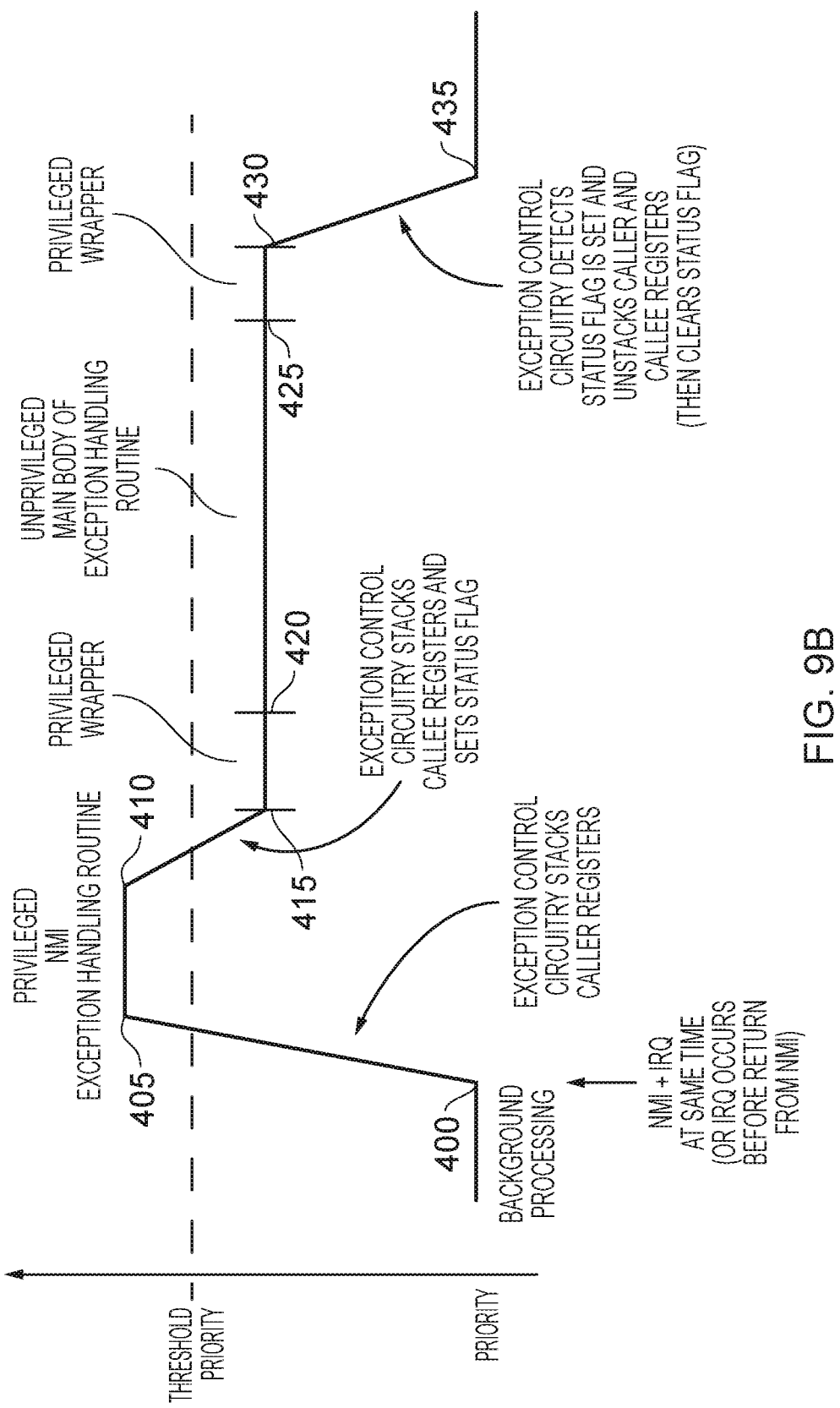
Figure 9C:
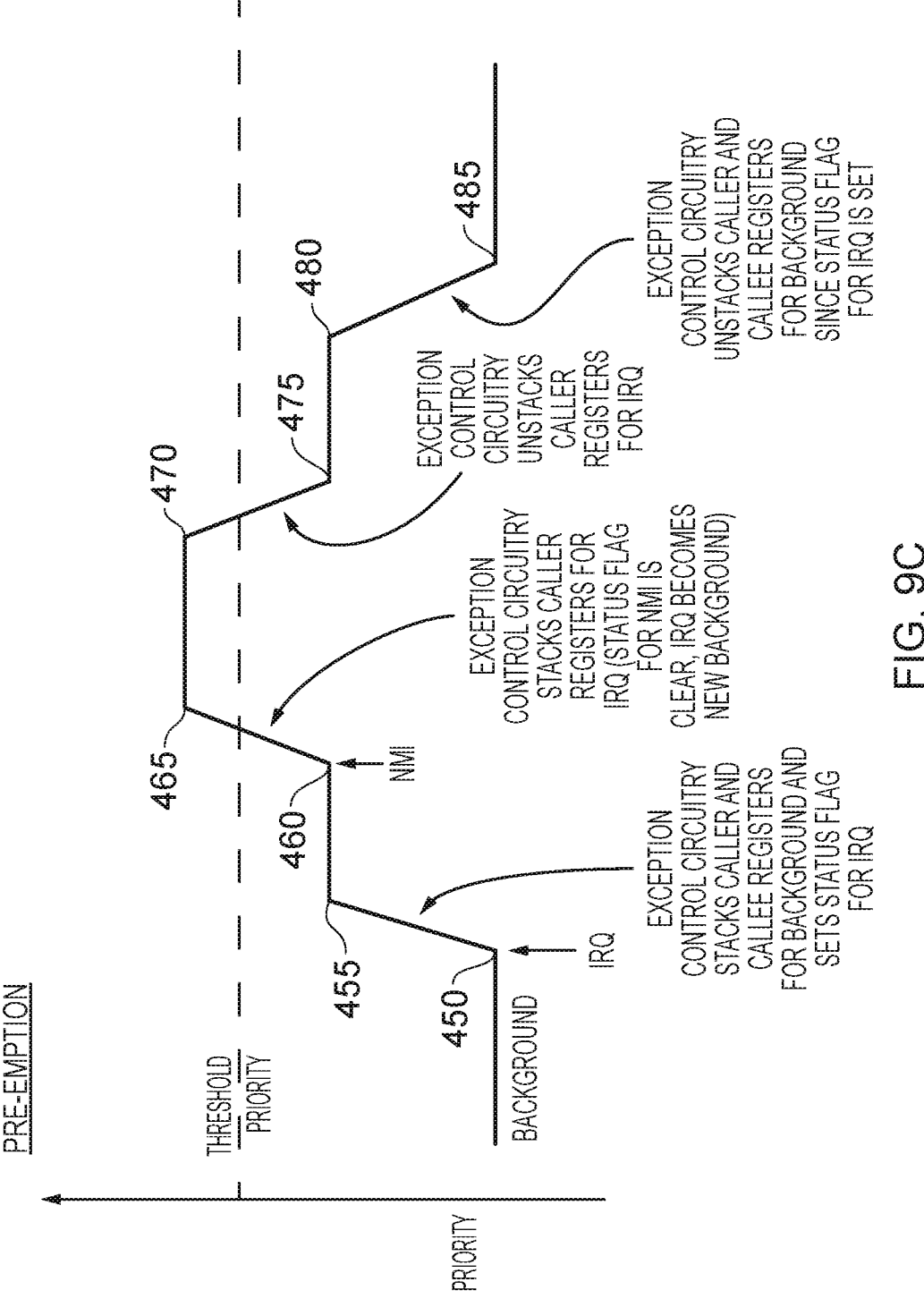

FIGS. 9A to 9C illustrate the handling of exceptions in a variety of example scenarios, in situations where the configuration information stored in the configuration storage 32 provides a threshold priority. FIG. 9A illustrates an example where an exception occurs from background processing, where the exception is of a lower priority than the threshold priority. As discussed earlier, the priority values used to infer priority can take a variety of forms. For instance, in one implementation it may be the case that a lower priority value indicates a lower priority, but in one particular example implementation it is actually the case that a lower priority value indicates a higher priority. Similarly, as discussed earlier, it may be that the priorities are modified and/or remapped before being compared. However the priority values are encoded and processed, it will be appreciated that, based on knowledge of a resulting priority associated with an exception, and knowledge of the resulting threshold priority, it can be determined whether the resulting priority of the exception is below the resulting threshold priority or not.

In the example of FIG. 9A, an interrupt is received at point 350 during the handling of background processing, causing the exception control circuitry 30 to handle a transition from the background processing to execution of the required exception handling routine. During the transition between points 350 and 355, the exception control circuitry 30 references the configuration storage 32 in order to obtain the threshold priority, and assesses whether the priority of the exception is below the threshold priority or not. In this example it is determined that the exception's priority is below the threshold priority, and accordingly the exception control circuitry triggers the stacking of both the caller and callee registers to the relevant stack 28 within the memory system 26, and sets the status flag to identify that the callee registers have been stacked.

In the example of FIG. 9A it is assumed that the main body of the exception handling routine is to be executed in the unprivileged state, and in one example implementation wrapper software is associated with the main body of the exception handling routine to handle transition into and out of the main body of the exception handling routine. It should be noted that the background code could be being executed in the privileged state or the unprivileged state within the earlier-described thread mode, and in one example implementation, irrespective of whether the background code is in the unprivileged or the privileged state, the exception handling routine entry at point 355 occurs with the processing circuitry operating in the handler mode in the privileged state, and accordingly the wrapper software is executed in the privileged state and may by referred to as a privileged wrapper.

Since the exception control circuitry hardware 30 has stacked the callee registers as well as the caller registers, then the privileged wrapper software does not need to take any steps to stack the callee registers, and instead merely needs to take whatever other additional steps are required prior to handling over execution to the unprivileged main body of the exception handling routine. Similarly, following execution of the main body of the exception handling routine between points 360 and 365, the privileged wrapper is again used to take any steps necessary prior to handing over to the exception control circuitry 30 to manage the transition back to background processing, and again does not need to take any steps with regard to the unstacking of the callee registers, since the exception control circuitry hardware will take care of that process. As a result, the interrupt latency associated with the performance of the exception handling routine can be significantly reduced.

During the transition between points 370 and 375, the exception control circuitry detects that the status flag is set and unstacks both the caller and the callee registers. At this point it may also then clear the status flag. As discussed earlier, the storage location of the status flag by the time the exception return is handled by the exception control circuitry may vary. For example, whilst on exception entry the exception control circuitry may have set the status flag as a bit within the link register, it is possible that the link register contents have been moved in the interim, and may for example have ended up on a stack themselves, and accordingly the exception control circuitry will access the status flag from the relevant location when making an evaluation during exception return as to which registers need to be unstacked. As discussed earlier, in some implementations the status flag is set in an exception return value, this value is a reserved non-executable address, and the exception return process triggers an attempt to branch to the exception return value. In such cases the act of branching to the exception return value also has the effect of passing the status flag from the intermediate storage location (eg the stack) to the exception handling circuitry.

In some implementations, it may not be necessary to actually clear the status flag on the exception return, since in instances where the status flag forms a field within the exception return value, the exception return value is consumed on the exception return, and hence ceases to exist at that point.

FIG. 9B illustrates a second example scenario where two interrupts are received simultaneously at point 400 during the handling of background processing. In this instance both a non-masked interrupt (NMI) and a standard interrupt (IRQ) are received, and the NMI is handled first as it has a higher priority. Between the points 400 and 405, the exception control circuitry 30 assesses the priority of the NMI against the threshold priority, and determines that the NMI has a higher priority than the threshold priority. As a result, the exception control circuitry merely stacks the caller registers. As discussed earlier with reference to FIG. 4, it may be that the exception control circuitry also performs additional checks to determine whether the callee registers should be stacked, but for the purposes of the present discussion it will be assumed that any such further checks that are performed result in a determination that the callee registers do not need to be stacked.

Between points 405 and 410, an NMI exception handling routine is executed in order to process the NMI. In this instance, it is assumed that the exception handling routine is executing entirely whilst in the handler mode, with the processing circuitry operating in the privileged state.

At step 410, the exception handling routine processing the NMI completes, and it is determined that there is a tail-chained exception, i.e. the original IRQ interrupt. It should be noted that whilst in the example shown in FIG. 9B the NMI and IRQ interrupts were received at exactly the same time, the processing shown in FIG. 9B will also arise if the IRQ exception occurred at any point during the handling of the NMI, prior to point 410.

Between points 410 and 415, the exception control circuitry 30 determines whether the priority of the IRQ interrupt is above or below the threshold priority, and in this instance determines that it is below the threshold priority. Accordingly, with reference to the earlier described FIG. 7, it is determined at step 255 that the exception handling routine to be executed to process the IRQ interrupt is of the second category, and then at step 260 it is determined that the status flag does not indicate that the callee registers have already been saved. In particular, it will be recalled that only the caller registers were saved during the transition between points 400 and 405. Accordingly, the exception control circuitry now triggers the stacking of the callee registers, clearing of the registers, and sets the status flag to indicate that the callee registers have been saved.

The exception handling routine required to process the IRQ interrupt is then performed between points 415 and 430, and as per the earlier discussion of FIG. 9A, it is assumed that the main body of the exception handling routine is handled in the unprivileged state by executing a thread in the thread mode between points 420 and 425, and that the transition to and from that unprivileged thread is managed by privileged wrapper software executing in the handler mode.

At point 430, execution of the exception handling routine is considered to have been completed, and accordingly the exception control circuitry 30 determines at this point that there is no further tail-chained exception, and that processing should return to the background processing at point 435. During the transition to background processing, the exception control circuitry detects that the status flag is set and hence triggers the unstacking of both the caller and callee registers. If necessary, it may also clear the status flag at this point, but as mentioned above this may not be necessary as the status flag may cease to exist following the exception return.

FIG. 9C illustrates a pre-emption example, where during execution of an exception handling routine for an interrupt, a higher priority interrupt is received. In particular, at point 450 a standard IRQ interrupt is received, and between points 450 and 455 the exception control circuitry 30 determines that the priority of that interrupt is below the threshold priority, and accordingly triggers the stacking of both the caller and callee registers for the background processing and sets a status flag associated with the IRQ interrupt to indicate that both the caller and callee registers have been saved. As discussed earlier, the content of those registers will then typically be cleared prior to handing over to the exception handling routine to be executed to handle the IRQ interrupt. For the purposes of the illustration of FIG. 9C, it does not matter whether the exception handling routine used to process the IRQ interrupt is executed in the privileged state or the unprivileged state, and hence whether there is any associated wrapper software or not. However, at some point during the processing of the exception handling routine, an NMI is received at point 460, this having a higher priority than the IRQ interrupt. Accordingly, the NMI is treated as a pre-empting exception, and processing of the exception handling routine for the IRQ interrupt is halted whilst the NMI exception is processed.

In particular, as shown in FIG. 9C, between points 460 and 465, the exception control circuitry detects that the priority of the NMI is above the threshold priority, and hence stacks the state of the caller registers as being used by the exception handling routine processing the IRQ interrupt. It also clears a status flag value associated with the NMI, and the IRQ exception handling routine is treated as the new background processing at that point.

The exception handling routine used to process the NMI is performed between points 465 and 470, whereafter it is determined that there is an exception return to background processing (in this event the background processing being the exception handling routine that was processing the IRQ). Between points 470 and 475, the exception control circuitry determines from the status flag for the NMI that only the caller registers have been stacked, and accordingly only triggers the unstacking of the caller registers pertaining to the exception handling routine for the IRQ interrupt.

Between points 475 and 480, the exception handling routine used to process the IRQ interrupt is completed, and then at step 480 it is detected that there is a return to background processing (the original background processing). Accordingly, the exception control circuitry determines that the status flag for the IRQ interrupt is set, and accordingly unstacks both the caller and callee registers pertaining to the background processing between points 480 and 485, whereafter background processing resumes.

Figure 10:
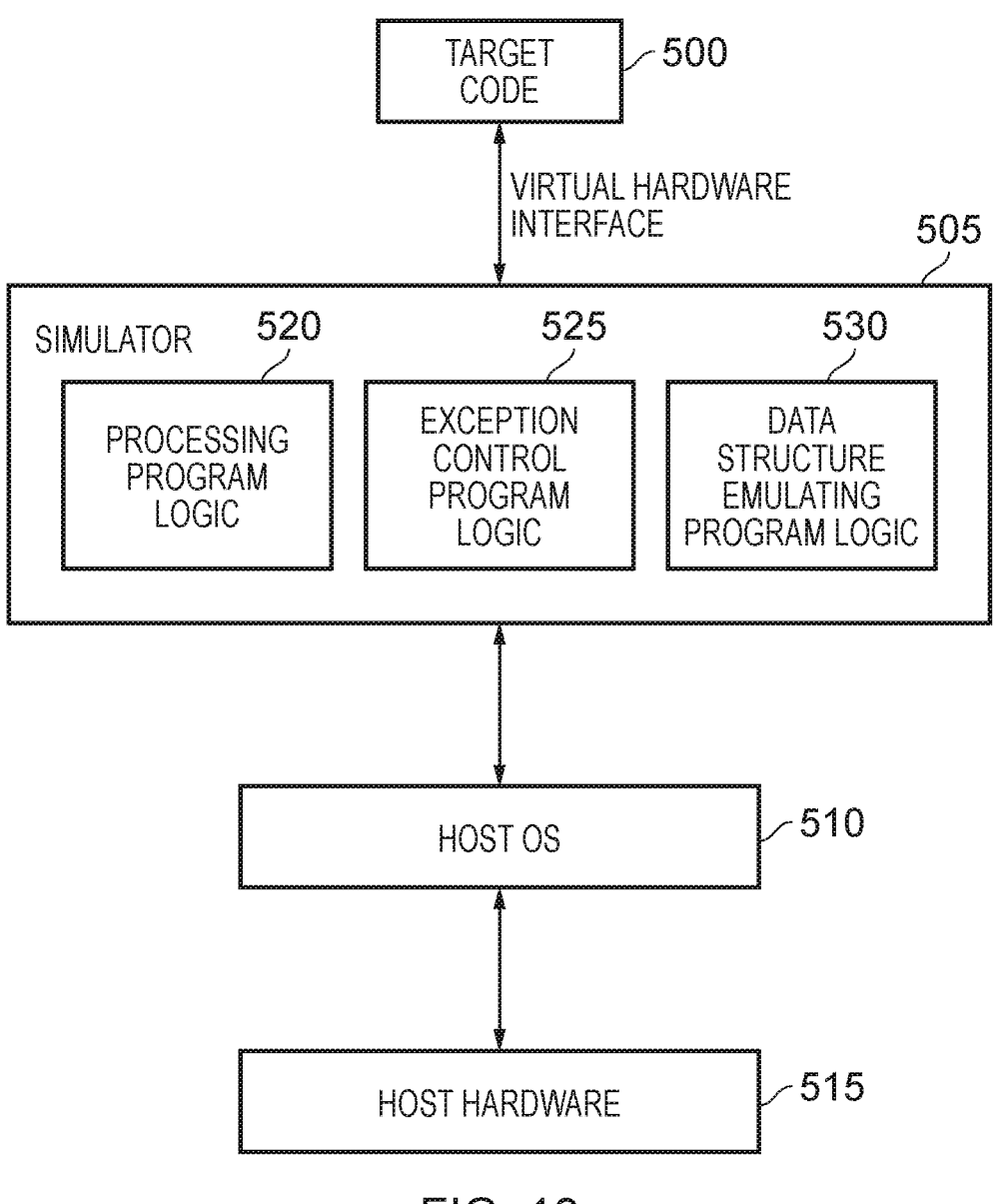
FIG. 10 shows a simulator example that can be used.

FIG. 10 illustrates a simulator implementation that may be used. Whilst the earlier described examples implement the present invention in terms of apparatus and methods for operating specific processing hardware supporting the techniques concerned, it is also possible to provide an instruction execution environment in accordance with the examples described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically a simulator implementation may run on a host processor 515, optionally running a host operating system 510, supporting the simulator program 505. In some arrangements there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990, USENIX Conference, Pages 53 to 63.

To the extent that examples have previously been described with reference to particular hardware constructs or features, in a simulated implementation equivalent functionality may be provided by suitable software constructs or features. For example, particular circuitry may be provided in a simulated implementation as computer program logic. Similarly, memory hardware, such as register or cache, may be provided in a simulated implementation as a software data structure. Also, the physical address space used to access memory 26 in the hardware apparatus 2 could be emulated as a simulated address space which is mapped on to the virtual address space used by the host operating system 510 by the simulator 505. In arrangements where one or more of the hardware elements referenced in the previously described examples are present on the host hardware (for example host processor 515), some simulated implementations may make use of the host hardware, where suitable.

The simulator program 505 may be stored on a computer readable storage medium (which may be a non-transitory medium), and provides a virtual hardware interface (instruction execution environment) to the target code 500 (which may include applications, operating systems and a hypervisor) which is the same as the hardware interface of the hardware architecture being modelled by the simulator program 505. Thus, the program instructions of the target code 500 may be executed from within the instruction execution environment using the simulator program 505, so that a host computer 515 which does not actually have the hardware features of the apparatus 2 discussed above can emulate those features. The simulator program may include processing program logic 520 to emulate the behaviour of the processing pipeline 4, and exception control program logic 525 to emulate behaviour of the exception control circuitry 30 of the hardware apparatus 2 of FIG. 1. The architectural registers 6 of the system 2 may also be emulated using data structure emulating program logic 530 maintained by the simulator code 505, for mapping the architectural registers of a target architecture on to the memory space used by the host hardware 515. Such data structure emulating program logic 530 can also be used to emulate the configuration storage 32 of the system 2 by providing a suitable storage location within the memory space used by the host hardware 515. Hence, the techniques described herein for stacking and unstacking the caller and callee registers based on a cat-egorisation of the exception handling routine to be executed can in the example of FIG. 10 be performed in software by the simulator program 505.

Through use of the techniques described herein, a system can be provided that supports the use of both trusted and untrusted exception handling routines, whilst allowing a low interrupt latency to be maintained through the selective use of exception control circuitry hardware to manage the stacking and unstacking of not only caller registers but also callee registers. Through use of suitable configuration information, the exception control circuitry can seek to distinguish between trusted exception handling routines and untrusted exception handling routines, and to only stack both the caller and callee registers in association with exception handling routines that it has determined should be treated as untrusted. This reduces latency associated with the handling of the untrusted exception handling routines, without adversely impacting the speed of performance of trusted exception handling routines.

In the present application, the words "configured to . . ." are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative examples of the invention have been described in detail herein with reference to the accompanying drawings, it is to be understood that the invention is not limited to those precise examples, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

processing circuitry configured, in one of a plurality of security domains comprising at least a secure domain and a less secure domain, to execute program code that includes a plurality of exception handling routines executed in response to corresponding exceptions;

a plurality of registers configured to store data for access by the processing circuitry when executing the program code, the plurality of registers comprising a first subset of registers and a second subset of registers non-overlapping with the first subset of registers;

exception control circuitry, responsive to occurrence of a given exception from background processing, to trigger a state saving operation to save data from the plurality of registers before triggering the processing circuitry to execute a given exception handling routine corresponding to the given exception;

and, configuration storage configured to store configuration information used to categorize exception handling routines within the plurality of exception handling routines, wherein the exception control circuitry is configured to determine with reference to the configuration information whether the given exception handling routine is of a first category or a second category within the one of the plurality of security domains that the given exception handling routine will be executed in, and is configured, when triggering the state saving operation, to trigger saving the data from the first subset of registers when the given exception handling routine is of the first category, and to trigger saving the data from both the first subset and the second subset of registers when the given exception handling routine is of the second category; and the exception control circuitry is configured to determine with reference to the configuration information whether the given exception handling routine is of the first category or the second category independent of whether any change in security domain will occur when transitioning from the background processing to execution of the given exception handling routine.

2. The apparatus as claimed in claim 1, wherein at least when the given exception handling routine is of the second category the exception control circuitry is further configured to trigger clearing of registers whose data is saved during the state saving operation, prior to triggering the processing circuitry to execute the given exception handling routine.

3. The apparatus as claimed in claim 1, wherein the first category indicates an exception handling routine that is trusted, and the second category indicates an exception handling routine that is to be treated as untrusted.

4. The apparatus as claimed in claim 3, wherein the processing circuitry is operable in an unprivileged state and a privileged state, and the processing circuitry is operable to execute, whilst in the unprivileged state, at least a main body of the exception handling routines that are untrusted.

5. The apparatus as claimed in claim 1, wherein the configuration storage is configured to store, for one or more exception handling routines, a corresponding item of the configuration information.

6. The apparatus as claimed in claim 5, wherein the item of the configuration information is set to a first value to indicate that the corresponding exception handling routine is trusted and is set to a second value to indicate that the corresponding exception handling routine is treated as untrusted.

7. The apparatus as claimed in claim 1, wherein:
the configuration storage is configured to identify a threshold priority;
each exception has an associated priority; and,
the exception control circuitry is configured to determine whether the given exception handling routine is of the first category or the second category dependent on a comparison of a value derived from the associated priority of the given exception and a value derived from the threshold priority.

8. The apparatus as claimed in claim 7, wherein the exception control circuitry is configured to determine that the given exception handling routine is of the second category when the associated priority of the exception is less than the threshold priority.

9. The apparatus as claimed in claim 1, wherein the exception control circuitry is configured to set a status flag to identify whether the data from the second subset of registers has been saved.

10. The apparatus as claimed in claim 9, wherein the exception control circuitry is configured on an exception return to reference the status flag in order to determine whether data in the second subset of registers need to be restored.

11. The apparatus as claimed in claim 1, wherein the exception control circuitry is configured, when triggering the state saving operation, to cause the data to be saved to a stack data structure.

12. The apparatus as claimed in claim 1, wherein:
in response to a tail-chained exception corresponding to a further exception handling routine, to be executed after the given exception handling routine has been executed and before returning to the background processing, the exception control circuitry is configured to determine with reference to the configuration information whether the further exception handling routine is of the first category or the second category; and,
when the exception control circuitry determines that the further exception handling routine is of the second category and the data from the second subset of registers has not already been saved, the exception control circuitry is configured to trigger saving the data from the second subset of registers before triggering the processing circuitry to execute the further exception handling routine.

13. The apparatus as claimed in claim 12, wherein the exception control circuitry is further configured to trigger clearing of registers whose data is saved, before triggering the processing circuitry to execute the further exception handling routine for the tail-chained exception.

14. The apparatus as claimed in claim 12, wherein the exception control circuitry is further configured to reference the status flag, such that when the exception control circuitry determines that the further exception handling routine for the tail-chained exception is of the second category, the exception control circuitry is configured to skip triggering saving the data from the second subset of registers when the status flag indicates that that data has already been saved.

15. The apparatus as claimed in claim 1, wherein the background processing comprises execution of program code other than an exception handling routine and the given exception is an initial exception.

16. An apparatus as claimed in claim 1, wherein the background processing comprises execution of a current exception handling routine and the given exception is a preempting exception of higher priority than the exception corresponding to the current exception handling routine.

17. The apparatus as claimed in claim 1, wherein:
the configuration storage is configured to store, for each security domain, configuration information used to categorize the plurality of exception handling routines associated with that security domain; and,
the exception control circuitry is configured to determine whether the given exception handling routine is of the first category or the second category with reference to the configuration information provided for the security domain in which the given exception handling routine is to be executed.

18. The apparatus as claimed in claim 1, wherein within a given security domain the processing circuitry is configured to perform data processing in one of a plurality of states including an unprivileged state and a privileged state.

19. The apparatus as claimed in claim 1, wherein:
the exception control circuitry is further configured, in response to identifying an exception that is a first exception to cause a transition from the secure domain to the less secure domain in a situation where the background processing was performed by the processing circuitry in the secure domain, to trigger saving the data from the second subset of registers before triggering the processing circuitry to execute an exception handling routine corresponding to that identified exception.

20. The apparatus as claimed in claim 19, wherein the exception control circuitry is further configured to reference the status flag, such that in response to the identified exception the exception control circuitry is configured to skip triggering saving the data from the second subset of registers when the status flag indicates that that data has already been saved.

21. A method of handling exceptions within an apparatus, comprising:

executing, on processing circuitry operable in one of a plurality of security domains comprising at least a secure domain and a less secure domain, program code that includes a plurality of exception handling routines executed in response to corresponding exceptions;

storing in a plurality of registers data for access by the processing circuitry when executing the program code, the plurality of registers comprising a first subset of registers and a second subset of registers non-overlapping with the first subset of registers;

employing exception control circuitry, in response to occurrence of a given exception from background processing, to trigger a state saving operation to save data from the plurality of registers before triggering the processing circuitry to execute a given exception handling routine corresponding to the given exception;

storing configuration information used to categorize exception handling routines within the plurality of exception handling routines;

determining with reference to the configuration information whether the given exception handling routine is of a first category or a second category within the one of the plurality of security domains that the given exception handling routine will be executed in;

and, causing the exception control circuitry, when triggering the state saving operation, to trigger saving the data from the first subset of registers when the given exception handling routine is of the first category, and to trigger saving the data from both the first subset and the second subset of registers when the given exception handling routine is of the second category;

wherein determining with reference to the configuration information whether the given exception handling routine is of the first category or the second category is independent of whether any change in security domain will occur when transitioning from the background processing to execution of the given exception handling routine.

22. A non-transitory computer-readable medium storing a computer program for controlling a host data processing apparatus to provide an instruction execution environment, comprising:

processing program logic, operable in one of a plurality of security domains comprising at least a secure domain and a less secure domain, to execute program code that includes a plurality of exception handling routines executed in response to corresponding exceptions;

data structure emulating program logic to maintain a plurality of register data structures to store data for access by the processing program logic when executing the program code, the plurality of register data structures comprising a first subset of data structures and a second subset of data structures non-overlapping with the first subset of data structures;

and exception control program logic, responsive to occurrence of a given exception from background processing, to trigger a state saving operation to save data from the plurality of register data structures before triggering the processing program logic to execute a given exception handling routine corresponding to the given exception;

wherein the data structure emulating program logic is further configured to maintain a configuration data structure to store configuration information used to categorize exception handling routines within the plurality of exception handling routines;

and, wherein the exception control program logic is configured to determine with reference to the configuration information whether the given exception handling routine is of a first category or a second category within the one of the plurality of security domains that the given exception handling routine will be executed in, and is configured, when triggering the state saving operation, to trigger saving the data from the first subset of data structures when the given exception handling routine is of the first category, and to trigger saving the data from both the first subset and the second subset of data structures when the given exception handling routine is of the second category; and the exception control program logic is configured to determine with reference to the configuration information whether the given exception handling routine is of the first category or the second category independent of whether any change in security domain will occur when transitioning from the background processing to execution of the given exception handling routine.

* * * * *